US007963052B2

(12) United States Patent
Koch et al.

(10) Patent No.: US 7,963,052 B2
(45) **Date of Patent: *Jun. 21, 2011**

(54) PLOW QUICK CONNECT / DISCONNECT HITCH MECHANISM

(75) Inventors: Timothy G. Koch, Slinger, WI (US); Kevin J. Kuechler, Saukville, WI (US); Mark D. Buckbee, Wauwatosa, WI (US); Daniel M. Brunner, Kewaskum, WI (US)

(73) Assignee: Sno-Way International, Inc., Hartford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/954,990

(22) Filed: Nov. 29, 2010

(65) Prior Publication Data

US 2011/0067273 A1 Mar. 24, 2011

Related U.S. Application Data

(63) Continuation of application No. 12/140,732, filed on Jun. 17, 2008, now Pat. No. 7,841,110.

(51) Int. Cl.
*E01H 5/04* (2006.01)

(52) U.S. Cl. ................ 37/231; 37/232; 37/235; 37/266; 172/272; 172/810; 172/817

(58) Field of Classification Search .................... 37/231, 37/232, 235, 236, 266, 279, 283, 468; 172/272, 172/810, 811, 817
See application file for complete search history.

(56) References Cited

U.S. PATENT DOCUMENTS

| | | | | | |
|---|---|---|---|---|---|
| 3,285,625 | A | * | 11/1966 | Krueger | 280/479.1 |
| 3,410,008 | A | * | 11/1968 | Standfuss | 37/231 |
| 3,851,894 | A | * | 12/1974 | St. Pierre | 280/460.1 |
| 3,987,562 | A | * | 10/1976 | Deen et al. | 37/231 |
| 4,074,448 | A | | 2/1978 | Niemela | |
| 4,304,056 | A | | 12/1981 | Watson et al. | |
| 4,436,477 | A | * | 3/1984 | Lenertz et al. | 414/723 |
| 4,658,519 | A | | 4/1987 | Quenzi | |
| 4,962,599 | A | * | 10/1990 | Harris | 37/266 |
| 5,195,261 | A | | 3/1993 | Vachon | |
| 5,353,530 | A | | 10/1994 | Pieper | |
| 5,568,694 | A | | 10/1996 | Capra et al. | |
| 6,012,240 | A | | 1/2000 | Klug et al. | |
| 6,145,222 | A | * | 11/2000 | Curtis | 37/231 |
| 6,170,178 | B1 | | 1/2001 | Christy | |
| 6,209,231 | B1 | | 4/2001 | Curtis | |
| 6,354,024 | B1 | | 3/2002 | Kost et al. | |
| 6,363,629 | B1 | | 4/2002 | Curtis | |
| 6,381,880 | B1 | | 5/2002 | Curtis | |

(Continued)

*Primary Examiner* — Thomas A Beach
*Assistant Examiner* — Matthew R Buck
(74) *Attorney, Agent, or Firm* — Reinhart Boerner Van Deuren s.c.

(57) ABSTRACT

A snow plow including a quick connect/disconnect hitch. The snow plow includes a hitch frame nose assembly configured to couple to a vehicle. The hitch frame nose assembly includes a chassis coupler secured at each end of a hitch frame tube with each chassis coupler including a traverse pin. A plow frame is included with the plow frame having a front portion and a rear portion. A plow blade is coupled to the front portion of the plow frame. A lift bar assembly is coupled to the rear portion of the plow frame. A lift bar assembly includes a pair of notched members with each notch member aligned with a corresponding chassis coupler of the hitch frame nose assembly. Each of the notched members is configured to engage the traverse pin in each of the chassis couplers, wherein the snow plow is pivotally coupled to the vehicle.

20 Claims, 18 Drawing Sheets

U.S. PATENT DOCUMENTS

| | | | | |
|---|---|---|---|---|
| 6,408,546 | B2 | 6/2002 | Curtis | |
| 6,526,677 | B1 * | 3/2003 | Bloxdorf et al. | 37/231 |
| 6,557,275 | B2 * | 5/2003 | Curtis | 37/231 |
| 6,594,923 | B1 | 7/2003 | Kost et al. | |
| 6,594,924 | B2 * | 7/2003 | Curtis | 37/231 |
| 6,615,513 | B2 * | 9/2003 | Quenzi et al. | 37/231 |
| 6,618,964 | B2 | 9/2003 | Kost et al. | |
| 6,711,837 | B2 * | 3/2004 | Bloxdorf et al. | 37/231 |
| 6,928,757 | B2 * | 8/2005 | Bloxdorf et al. | 37/231 |
| 6,941,685 | B2 * | 9/2005 | Goy et al. | 37/232 |
| 6,944,978 | B2 * | 9/2005 | LeBlond et al. | 37/231 |
| 6,964,121 | B2 * | 11/2005 | Harris | 37/231 |
| 7,114,270 | B2 | 10/2006 | Potak | |
| 7,117,617 | B2 | 10/2006 | Kost et al. | |
| 7,146,754 | B2 * | 12/2006 | Schultz et al. | 37/231 |
| 7,290,359 | B2 | 11/2007 | Potak | |
| 7,334,357 | B1 * | 2/2008 | Altheide | 37/231 |
| 7,526,883 | B2 * | 5/2009 | Musso et al. | 37/231 |
| 7,574,820 | B2 * | 8/2009 | Musso et al. | 37/270 |
| 7,841,110 | B2 * | 11/2010 | Koch et al. | 37/231 |
| 2004/0088892 | A1 * | 5/2004 | Kost et al. | 37/231 |
| 2004/0172858 | A1 * | 9/2004 | Bloxdorf et al. | 37/231 |
| 2005/0076543 | A1 * | 4/2005 | Curtis | 37/231 |
| 2005/0120595 | A1 * | 6/2005 | Bloxdorf et al. | 37/266 |
| 2005/0144814 | A1 | 7/2005 | Potak | |
| 2005/0206126 | A1 | 9/2005 | Harris | |
| 2006/0010722 | A1 | 1/2006 | LeBlond et al. | |
| 2006/0055150 | A1 * | 3/2006 | Curtis | 280/477 |
| 2007/0101620 | A1 * | 5/2007 | Roy | 37/232 |
| 2008/0073090 | A1 * | 3/2008 | Harris | 172/275 |
| 2008/0115392 | A1 * | 5/2008 | Musso et al. | 37/231 |
| 2008/0116392 | A1 | 5/2008 | Brooker | |

* cited by examiner

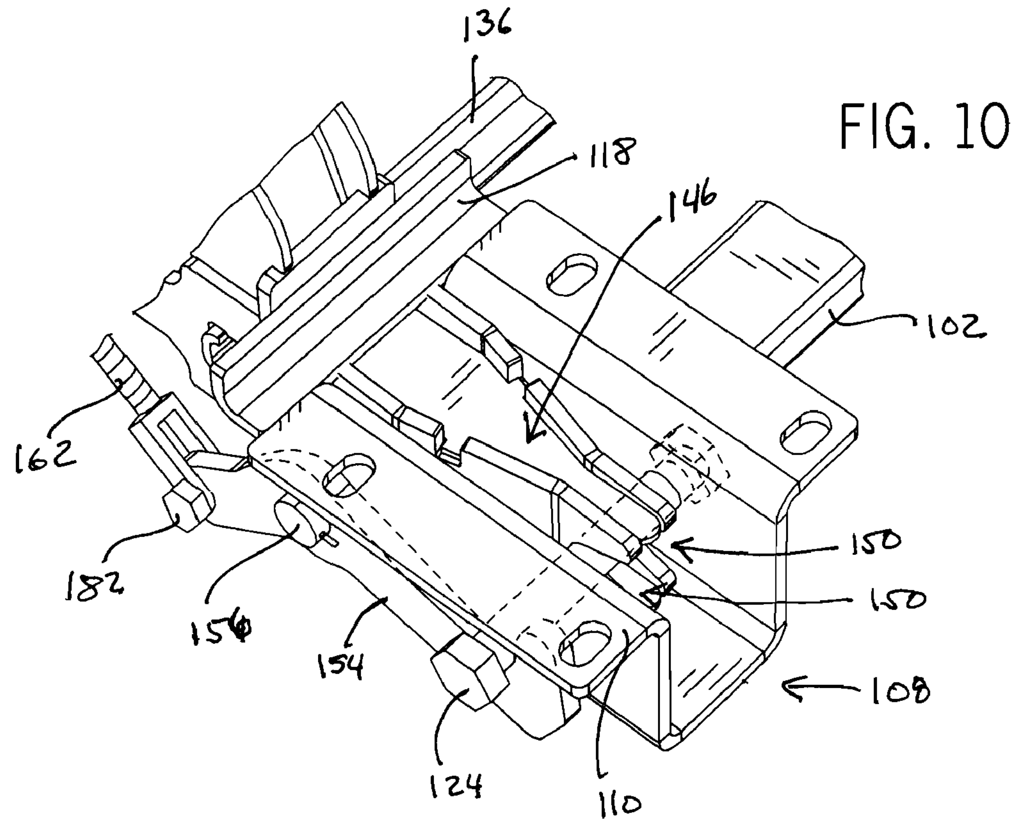
FIG. 10
FIG. 11
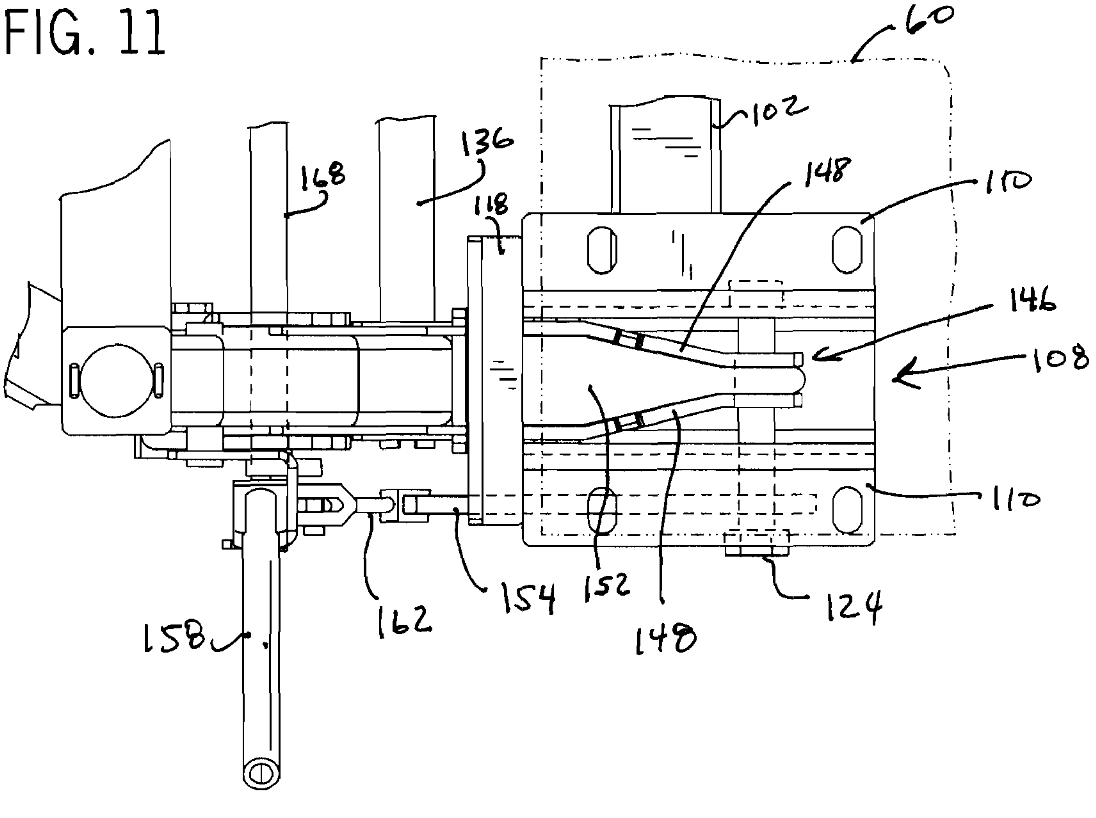

PLOW QUICK CONNECT / DISCONNECT HITCH MECHANISM

This patent application is a continuation of prior U.S. patent application Ser. No. 12/140,732 filed on Jun. 17, 2008, now U.S. Pat. No. 7,841,110, granted on Nov. 30, 2010, entitled "Plow Quick Connect/Disconnect Hitch Mechanism," which is assigned to the assignee of the present patent application, and which is hereby incorporated herein by reference. This patent application is related to U.S. patent application Ser. No. 12/140,903, filed on Jun. 17, 2008, now U.S. Pat. No. 7,513,069, granted on Apr. 7, 2009, entitled "Snow Plow Jack Stand;" U.S. patent application Ser. No. 12/140,893, filed on Jun. 17, 2008, now U.S. Pat. No. 7,640,682, granted on Jan. 5, 2010, entitled "Removable And Storable Wings For A Snow Plow Blade And Snow Removal System Used Therewith;" U.S. patent application Ser. No. 12/140,886, filed on Jun. 17, 2008, entitled "Snow Plow Blade Including Nut Retaining Plate," now abandoned; co-pending U.S. patent application Ser. No. 12/140,635, filed on Jun. 17, 2008, entitled "V-Plow;" and U.S. patent application Ser. No. 12/140,671, filed on Jun. 17, 2008, now U.S. Pat. No. 7,841,109, granted on Nov. 30, 2010, entitled "Plow Including Independently Moveable Wings," and all of which patent applications are assigned to the assignee of the present application, and all of which patent applications and patents are hereby incorporated herein by reference in their entirety.

BACKGROUND OF THE INVENTION

Field of the Invention

The present disclosure generally relates to material handling equipment, and more particularly to a plow with a hitch mechanism configured to be easily and quickly coupled to a vehicle.

It is known that plows, for example snow plows, are bolted to supports which are typically welded to the chassis of a vehicle, for example a truck. It is also known that a plow support can be bolted to the chassis of a vehicle. Since plows typically weigh hundreds of pounds, positioning the plow for attachment to the vehicle can be difficult. It is particularly difficult to maneuver a snow plow in the cold and snow of winter.

Accordingly, it is desirable to provide a plow hitch mounting mechanism which is easy to maintain and that the process of connecting and disconnecting the plow to or from the vehicle is simple and easy to use by one person without assistance.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, all of the aforesaid advantages should be achieved without incurring any substantial relative disadvantage.

SUMMARY OF THE INVENTION

The disadvantages and limitations of the background art discussed above are overcome by the present disclosure.

There is provided a snow plow including a quick connect/disconnect hitch. The snow plow includes a hitch frame nose assembly configured to couple to a vehicle. The hitch frame nose assembly includes a chassis coupler secured at each end of a hitch frame tube with each chassis coupler including a traverse pin. A plow frame is included with the plow frame having a front portion and a rear portion. A plow blade is coupled to the front portion of the plow frame. A lift bar assembly is coupled to the rear portion of the plow frame. A lift bar assembly includes a pair of notched members with each notch member aligned with a corresponding chassis coupler of the hitch frame nose assembly. Each of the notched members is configured to engage the traverse pin in each of the chassis couplers, wherein the snow plow is pivotally coupled to the vehicle. In another embodiment, the snow plow includes an adjustment lug coupled to each side of the rear portion of the plow frame. Each of the adjustment lugs defines a plurality of orifices aligned vertically, wherein the height of the plow frame can be adjusted relative to the vehicle when coupled to the lift bar assembly.

There is also provided a quick connect/disconnect hitch for mounting a plow onto a vehicle. The quick connect/disconnect hitch includes a hitch frame nose assembly configured to couple to a vehicle. The hitch frame nose assembly includes a chassis coupler secured at each end of a chassis tube with each chassis coupler including a traverse pin configured to attach to the vehicle chassis. A hitch frame, having a front portion and a rear portion, is coupled to a plow blade at the front portion of the hitch frame. A lift bar assembly is coupled to the rear portion of the hitch frame. The lift bar assembly includes a pair of notched members with each notched member aligned with a corresponding chassis coupler of the hitch frame nose assembly and is configured to engage the traverse pin in each of the chassis couplers wherein the plow is pivotally coupled to the vehicle.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 10 is a detail perspective view of a chassis coupler engaged with a notched member of the hitch frame mechanism illustrated in FIG. 3;

FIG. 11 is a top view of the chassis coupler illustrated in FIG. 10;

DETAILED DESCRIPTION OF THE PREFERRED EMBODIMENT

There is disclosed a snow plow 50 for mounting on a vehicle 60 with a quick connection/disconnect hitch 70 (more fully described below). The quick connect/disconnect hitch

70 facilitates the easy connection, i.e., without tools and disconnection of the snow plow 50 from the vehicle 60.

Figures 1, 2:
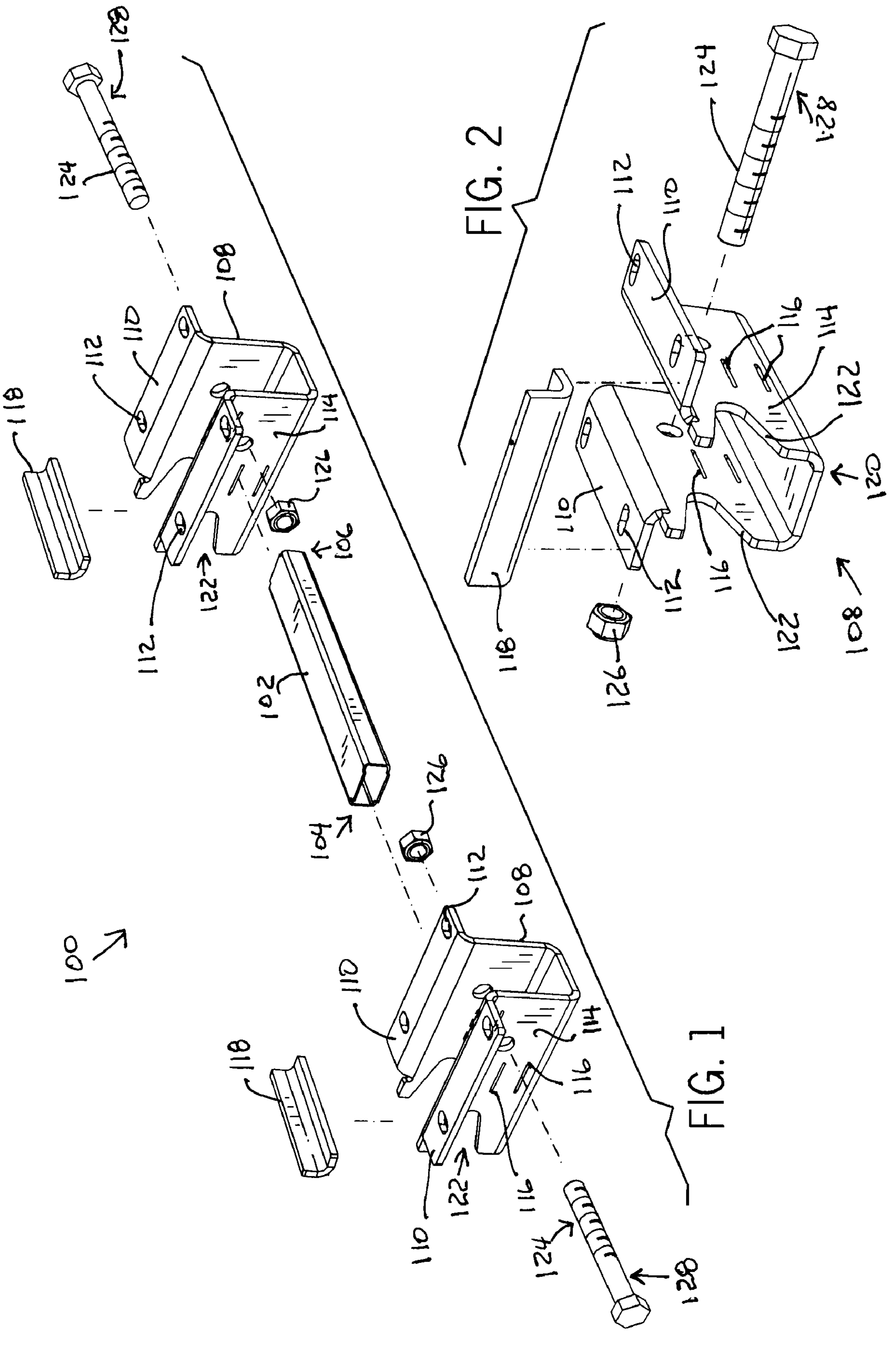
FIG. 1 is an exploded, isometric view of an exemplary embodiment of a hitch frame nose assembly.
FIG. 2 is a detail view of an exemplary embodiment of a chassis coupler of the hitch frame nose assembly illustrated in FIG. 1.

Referring to FIGS. 1 and 2, a hitch frame nose assembly 100 includes a hitch frame tube 102 having a first end 104 and a second end 106. Coupled to each end of the hitch nose tube 102 is a chassis coupler 108. Each chassis coupler 108 mounts to the vehicle chassis 60. In a typical set up, each of the chassis couplers 108 will be secured to a frame member of the vehicle chassis 70 (not shown) by bolting the chassis coupler 108 to the vehicle chassis 60. It is also contemplated that the chassis coupler 108 can be welded to the vehicle chassis 60 as determined by the user of the quick connect/disconnect hitch 70.

Each chassis coupler 108 is a formed U-shaped channel with outward extending flanges. The flanges 110 are configured to provide a mounting surface for the chassis coupler 108 to facilitate coupling of the chassis coupler 108 to the vehicle chassis 60. Each flange 110 defines a plurality of apertures 112 to facilitate bolting of the chassis coupler 108 to the vehicle chassis 60. The apertures 112 may be configured as circles or slots. Each side 114 of each chassis coupler 108 further defines a pair of slots 116 extending longitudinally along and through each side 114 of the chassis coupler 108. The slots 116 facilitate the coupling of the hitch frame tube 102 to each of the chassis couplers 108 comprising the hitch frame nose assembly 100. Each chassis coupler 108 may be provided with slots 116 on each side 114 of the chassis coupler 108 to facilitate manufacturing and assembly by providing commonality of parts. Each chassis coupler 108 is also provided with an end-stop coupled to each of the flanges 110 proximate the front end 120 of the chassis coupler 108. The end-stop 118 assists in positioning the chassis coupler 108 on the vehicle chassis 60. Each chassis coupler 108 also defines a substantially V-shaped notch 122 to accommodate a lock hook pivot more fully described below. Each chassis coupler 108 also includes a traverse pin 124 which extends through both sides 114 of the chassis coupler 108. Traverse pin 124 is secured to the chassis coupler 108 by a nut threadingly fastened to the traverse pin 104. The nut may further be welded to the chassis coupler 108 to further secure the traverse pin 124. A portion 128 of the traverse pin extends beyond the side 114 of the chassis coupler 108 and is configured to engage a locking hook more fully described below.

Figure 3A:
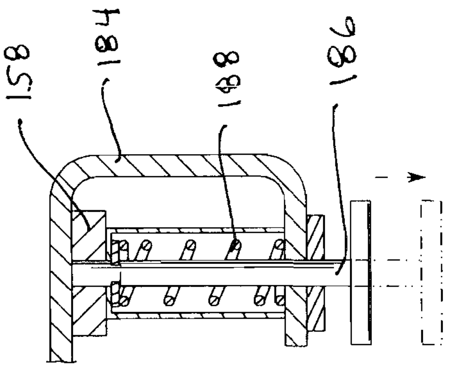
FIG. 3A is a cross-sectional view of an exemplary embodiment of a spring biased retaining pin along the line 3A-3A of FIG. 3.
Figure 3:
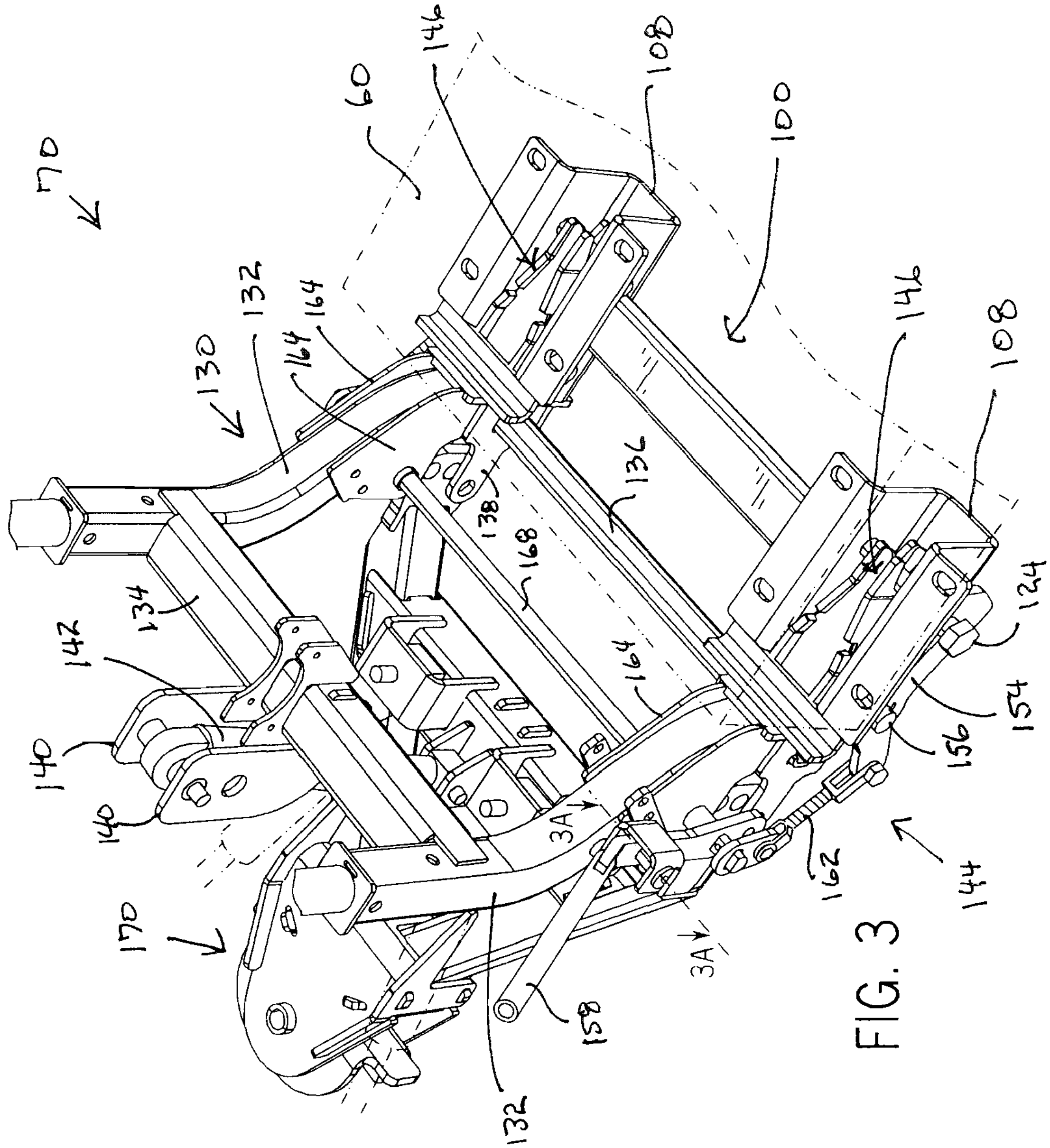
FIG. 3 is an isometric rear view of an exemplary embodiment of a hitch mechanism coupled to a vehicle.

FIG. 3 illustrates an exemplary embodiment of a quick connect/disconnect hitch 70 assembly. The hitch frame nose assembly 100 is coupled to a vehicle chassis 60. Coupled to the hitch frame nose assembly 100 is the lift bar assembly 130 which in turn is coupled to a plow frame 170.

Figure 12:
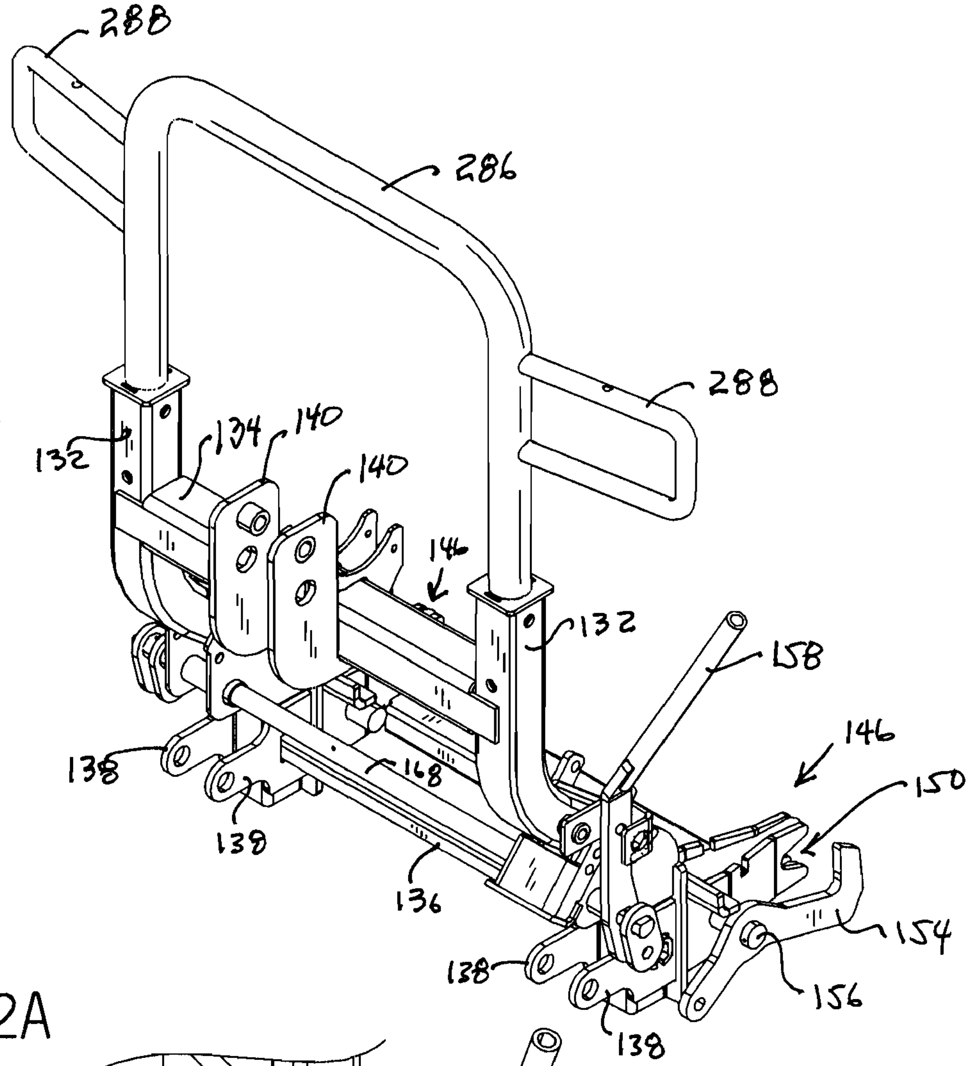
FIG. 12 is an isometric rear view of an exemplary embodiment of a lift bar assembly of the hitch mechanism illustrated in FIG. 3.
Figure 12A:
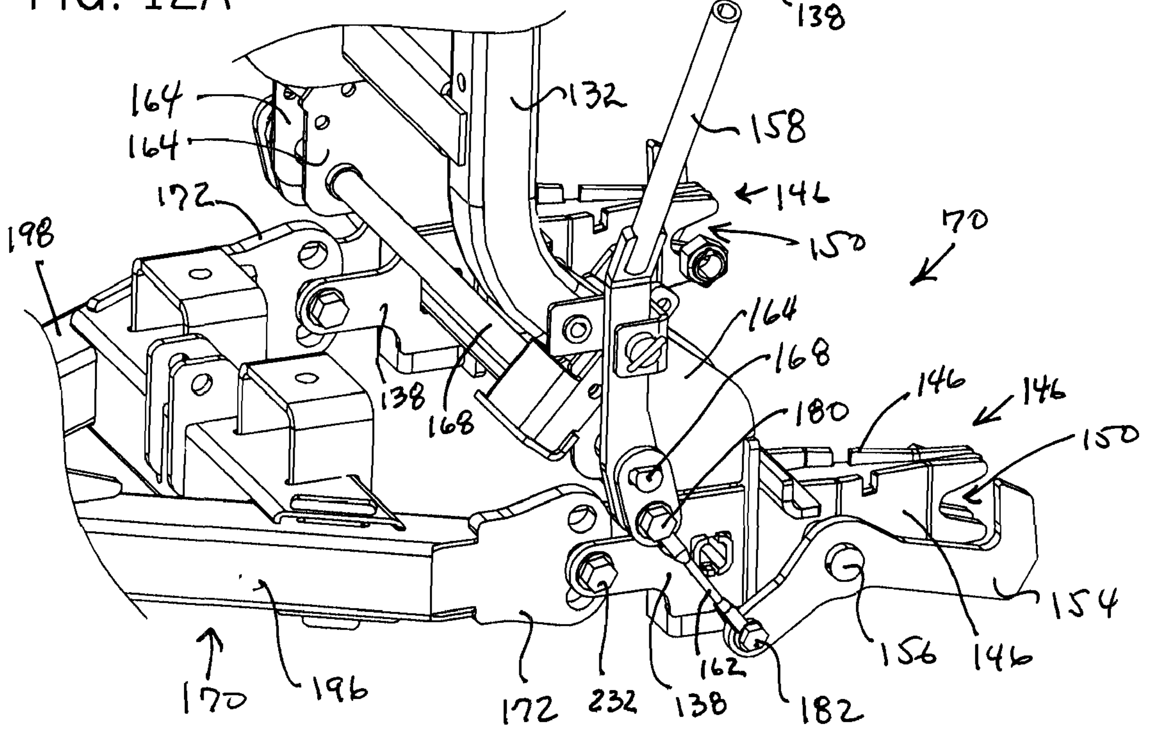
FIG. 12A is a partial view of the lift bar assembly illustrated in FIG. 12, illustrating the lift bar assembly coupled to the rear portion of a plow frame in one of a plurality height adjustment orifices.
Figure 12B:
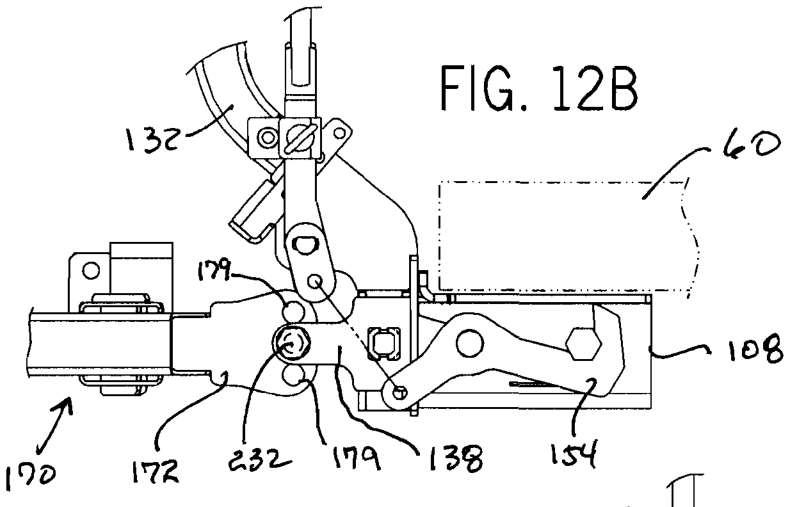
FIG. 12B is a partial side elevation of the hitch mechanism illustrated in FIG. 3.
Figure 12C:
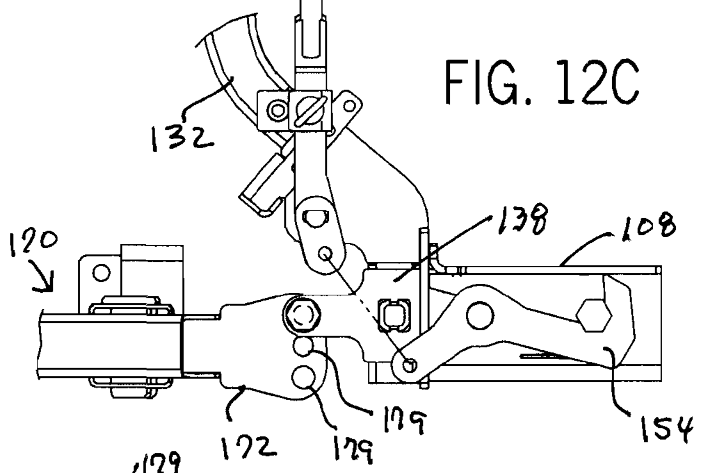
FIG. 12C is a partial side elevation of the hitch mechanism illustrated in FIG. 3 with the lift bar assembly coupled to the plow frame in an alternative height adjustment orifice.

The lift bar assembly 130 includes a pair of lift bar support members 132 maintained in a spaced apart relationship and coupled to a lift bar approximate the top of each lift bar support member 132. A light bar brace 136 approximate the lower end of each lift bar support member 132 facilitates maintenance of the spaced apart relationship of the lift bar support member 132. A pair of lift bar lugs 138 are coupled to each lift bar support member 132 approximate the light bar brace 136. (Also see FIGS. 12 and 12*a*). Coupled to the lift bar 134 are a pair of upper lift cylinder mounts 140 configured to operably secure a power mechanism, for example a lift cylinder 142. Also coupled to the lift bar assembly 130 is a locking mechanism 144.

Figure 4:
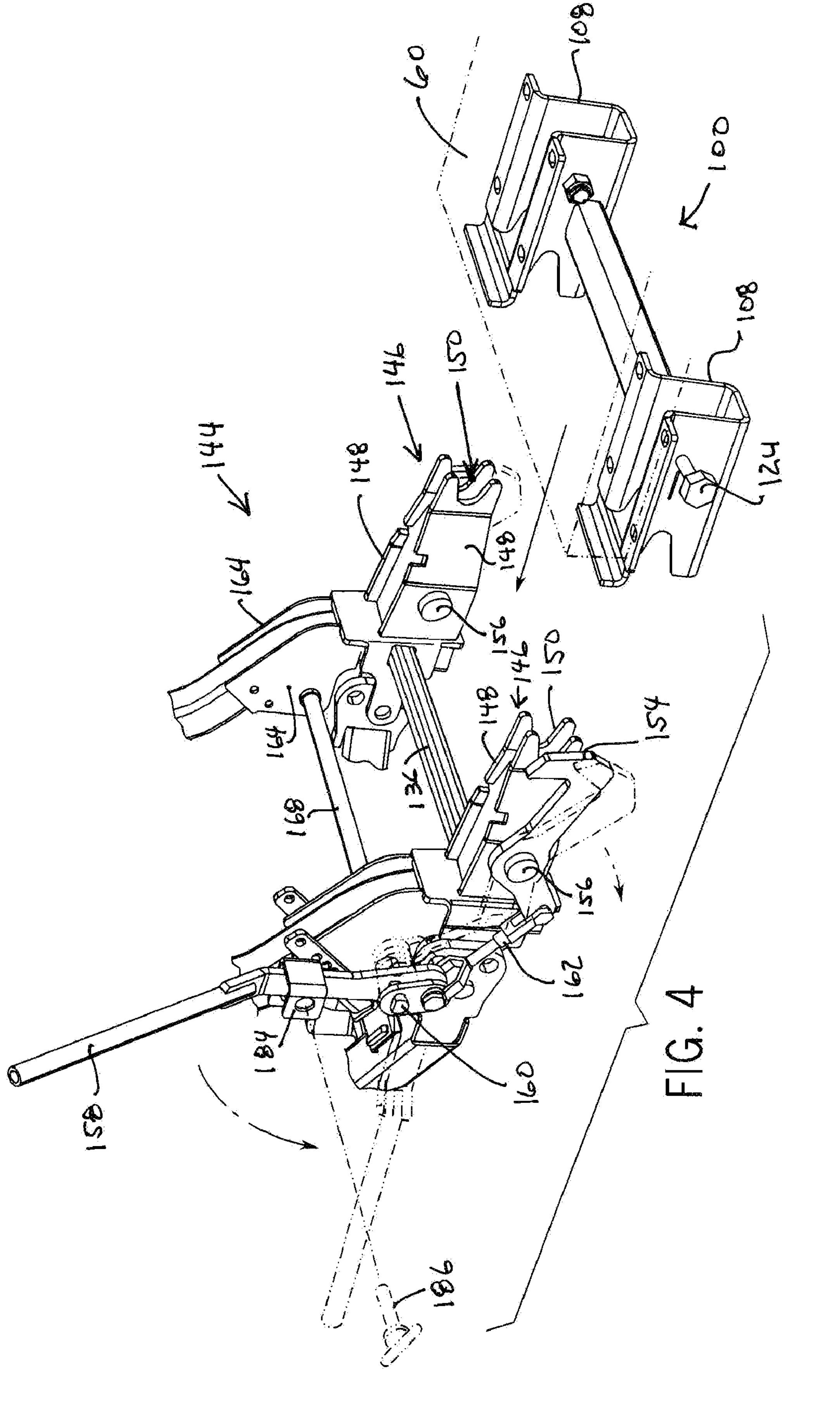
FIG. 4 is an isometric view of the hitch mechanism illustrated in FIG. 3 uncoupled from the hitch frame nose assembly.

Referring to FIG. 4, there is illustrated a hitch frame nose assembly 100 coupled to a vehicle chassis 60 and positioned to receive a locking mechanism 144 of a quick connect/disconnect hitch 70. The locking mechanism 144 includes a pair of notched members 146 coupled to the lift bar assembly 130 and positioned to correspond for engagement with each of the chassis couplers 108 of the hitch frame nose assembly 100.

Each notch member 146 includes a pair of tapered side members 148 with each tapered side member 148 defining a notch 150. Each notch 150 is configured to engage the traverse pin 124 positioned between the two sides 114 of each chassis coupler 108. Each notch member 146 also includes a plate member 152 fastened to the top portion of each of the tapered side members 148, typically by welding a plate member 150 to each tapered side member 148. The plate member provides additional reinforcement for the notch member 146 and defines with the two tapered side members 148 an inverted U-shape assembly. With the notch member 146 engaged with the chassis coupler 108 the pivot for the quick connect/disconnect hitch 70 formed by the engagement of the notch 150 with the traverse pin 124 is enclosed within the two facing u-shaped assemblies.

Each notched member 146 further includes a locking hook 154 pivotally coupled to a hook pivot 156. The hook pivot 156 extends through each of the tapered side members 148 of each notch member 146. The locking hook 154 moves about the hook pivot 156 in response to movement of the hitch locking lever 158 as the hitch locking lever 158 moves about a lever pivot 160. The hitch locking lever 158 is coupled to the locking hook 154 by a lock linkage 162. The operation of the locking mechanism 144 will be explained below.

The orientation of the locking hook 154 and the notch member 146 is such that when the notch member 146 is inserted into the chassis coupler 108 the locking hook is positioned outside of the u-shaped chassis coupler 108 and positioned to selectively engage the portion 128 of the traverse pin 124 that extends beyond the side 114 of the chassis coupler 108. It should be understood that there is a locking hook 154 on each of the notch members 146 which engages the traverse pin 124 extending beyond the side 114 of each of the chassis couplers 108 that are part of the hitch frame nose assembly 100. The locking hook 154 locks the lift bar assembly 130 to the hitch frame nose assembly 100.

Locking mechanism 144 also includes a lock support bracket 164 which is coupled to each of the lift bar support members 132. A preferred embodiment provides that a pair of lock support brackets 164 are coupled to each side of the corresponding lift bar support member 132. (FIGS. 3 and 4). It should be understood that the locking mechanism 144 includes a locking hook 154, hook pivot 156, lock linkage 162 on each outward side of the lift bar assembly 130. On one side of the lift bar assembly 130, the hitch locking lever 158 is coupled to the linkage, and on the other side of the lift bar assembly 130 the lock linkage 162 is coupled to a lock linkage bracket 166. (See FIG. 9). The lock linkage bracket 166 and the hitch locking lever 158 are coupled together by a hitch lock extension rod 168 extending through each of the lock support brackets 164 and each of the lift bar support members 132. The hitch lock lever 158 and the lock linkage bracket 166 are journaled to the hitch lock extension rod 168 by a flat face defined on each end of the hitch lock extension rod 168. (See FIGS. 8 and 9).

Figure 5:
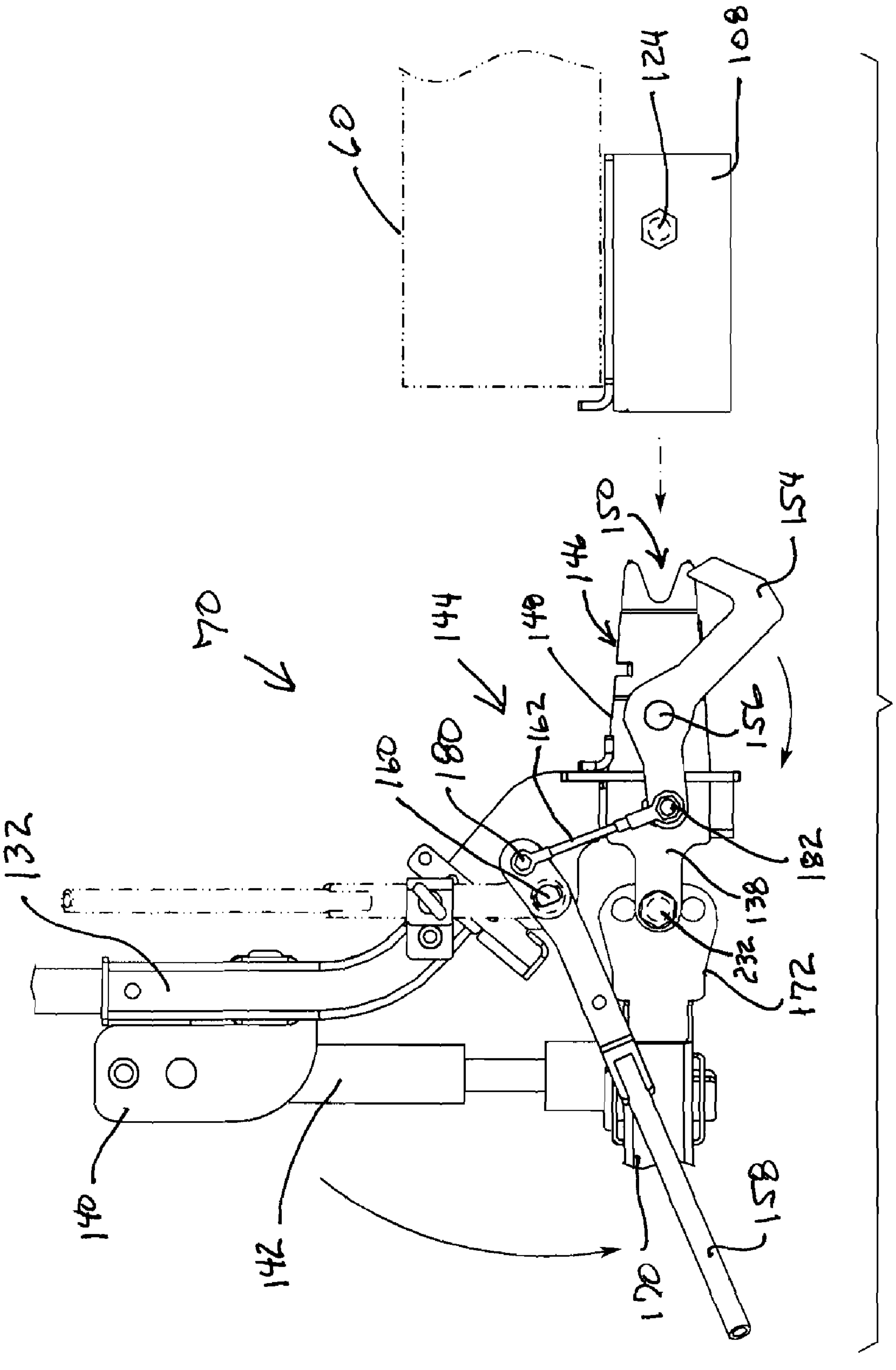
FIG. 5. is a side elevation of the hitch mechanism illustrated on FIG. 4.

The operation of coupling the quick connect/disconnect hitch 70 to the vehicle chassis 60 will now be described with reference to FIGS. 5 through 9. FIG. 5 illustrates an exemplary embodiment of a quick connect/disconnect hitch 70 positioned to engage the hitch frame nose assembly 100 coupled to a vehicle chassis 60. The hitch locking lever 158 is in an unlocked position 174. The movement of the hitch lock lever 158 to the unlocked position 174 rotated the locking hook as illustrated in FIG. 5. The vehicle having a hitch frame nose assembly 100 coupled to the vehicle chassis 60 is moved towards the quick connect/disconnect hitch 70 as indicated by the arrow in FIG. 5.

Figure 6:
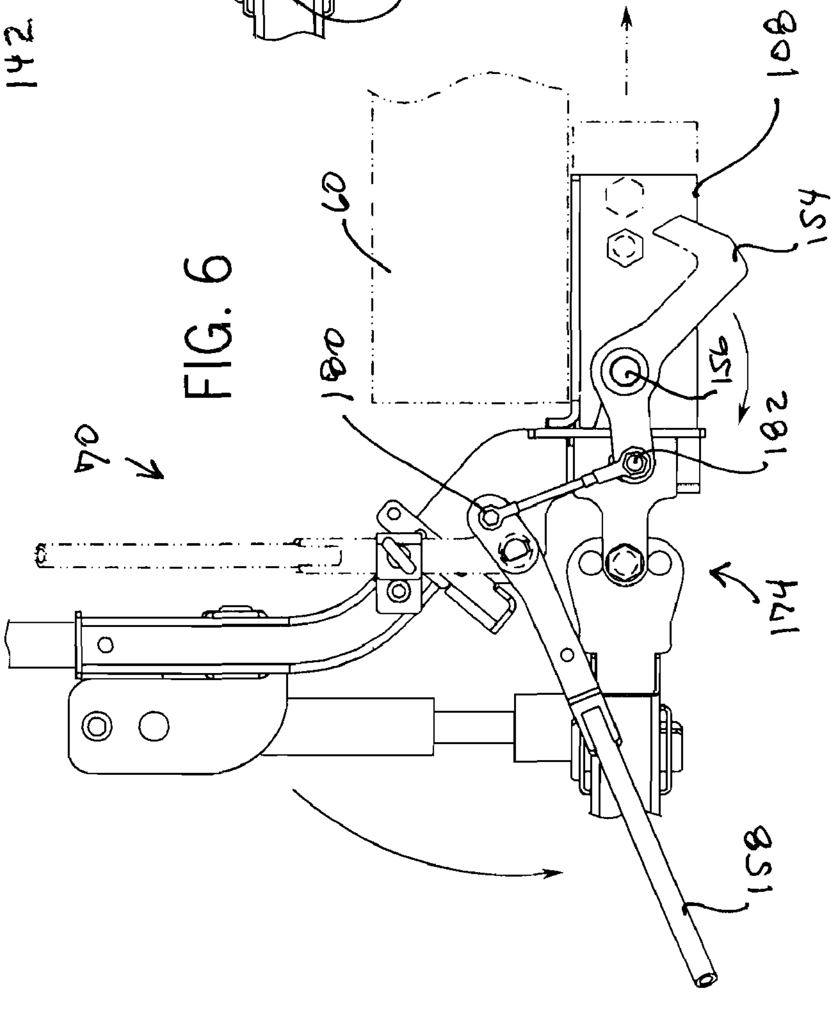
FIG. 6 is a side elevation of the hitch mechanism illustrated in FIG. 3 with the hitch mechanism configured to uncouple from the hitch frame nose assembly.

FIG. 6 illustrates the quick connect/disconnect hitch 70 engaged with the hitch frame nose assembly 100 with each notched member 146 of the lift bar assembly 130 coupled to the traverse pin 124 in each of the chassis couplers 108. Such engagement is illustrated at least in FIGS. 10 and 11. In this position, with the hitch locking lever 158 still in the unlocked position 174 the vehicle can be moved away from the hitch 70 if additional adjustment maneuvers are necessary.

Figure 7:
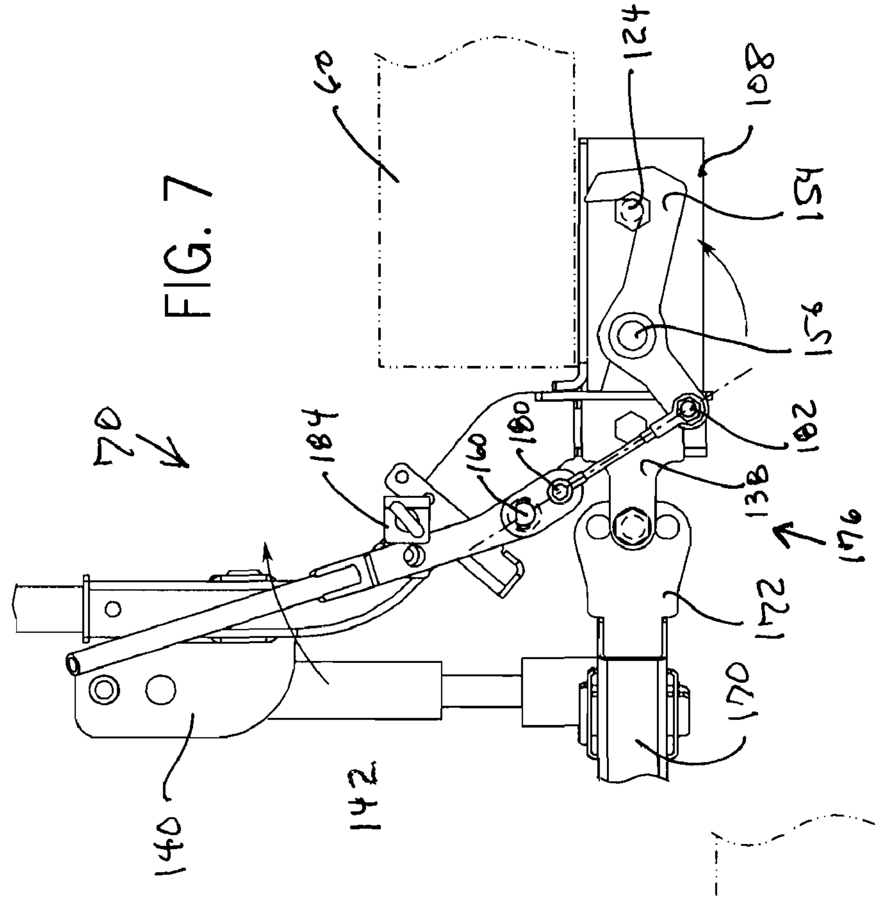
FIG. 7 is side elevation of the hitch mechanism illustrated in FIG. 3 with the hitch mechanism coupled to a chassis coupler of the hitch frame nose assembly and illustrating the hitch locking lever in a first lock position.

FIG. 7 illustrates the locking mechanism 144 in a first locked position 176. In the first locked position 176, the locking hook has moved to engage the traverse pin 124 in each of the chassis couplers 108. In this configuration, the lever pivot 160, the hitch locking lever linkage attachment 180 and the hook linkage attachment 182 are substantially in a straight line as illustrated in FIG. 7.

Figure 8:
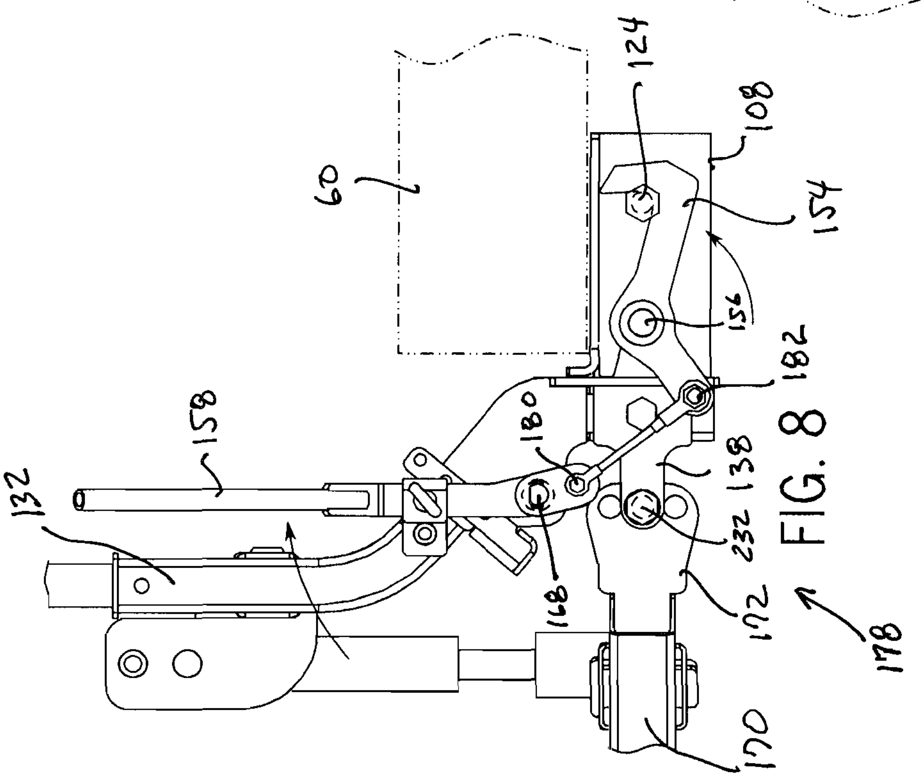
FIG. 8 is a side elevation of the hitch mechanism illustrated in FIG. 7 and illustrating the hitch locking lever in a second lock position.

To complete the locking maneuver of the locking mechanism 144, the hitch locking lever 158 is moved to a second locked position 178 which forces the hitch locking lever 158 to move over center of the lever pivot 160 as illustrated in FIG. 8. The hitch locking lever 158 also is secured in a retaining bracket 184 coupled to a locked support bracket 164. The retaining bracket 184 includes a retaining pin 186 which is biased by a spring 188. The retaining pin 186 engages an orifice defined in the hitch lever locking lever 158 as illustrated in FIG. 3A. It should be understood that other ways of securing the locking lever 158 can be used to prevent the locking lever 158 from inadvertently unlocking the hitch 70.

Figure 9:
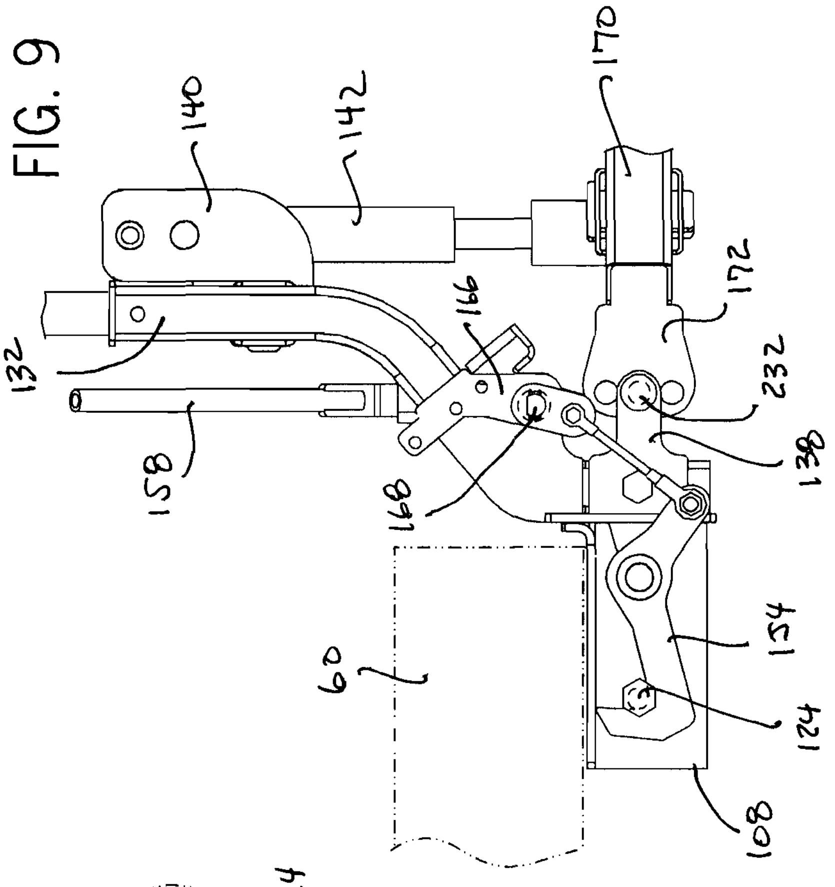
FIG. 9 is a side elevation of another side of the hitch mechanism illustrated in FIG. 8.

As described above, the locking mechanism 144 includes a lock hook 154 on each side of the lift bar assembly 130 and are coupled together to simultaneously operate with movement of the hitch locking lever 158. FIG. 9 illustrates the other side of the locking mechanism 144 illustrated in FIG. 8.

The lift bar assembly 130 is coupled to a plow frame 170. The lift bar assembly 130 is provided with a pair of lift bar lugs 138 coupled to the lift bar brace 136 and to each of the lock support brackets 164 on both sides of the lift bar assembly 130 (see FIG. 12).

A plow frame 170 is configured substantially in the form of a letter A with the plow frame 170 including a front portion 175 and a rear portion 177. The plow frame 170 includes two side member 196, 198 which form the sides of the A-shape with a traverse brace tube 200 coupled to each of the side members 196, 198. The side members 196, 198 and the traverse brace tube 200 are conventional steel square tubing, however, it is contemplated that other cross-section configured tubes, for example circular or triangular, can be used. Coupled to the front portion 175 of the plow frame 170 is a swing frame pivot assembly 185. The swing frame pivot assembly includes a top plate 187 and a bottom plate 189. Each of the plates 187, 189 defines an orifice configured to receive a swing frame pivot pin 190. The swing frame pivot assembly 185 is further coupled to each of the side members 196, 198 of the plow frame 170 by a pair of side support brackets 192, 194 which are configured to couple to each of the top plate 187, the bottom plate 189 and one of the side members of the plow frame 170.

Figure 13:
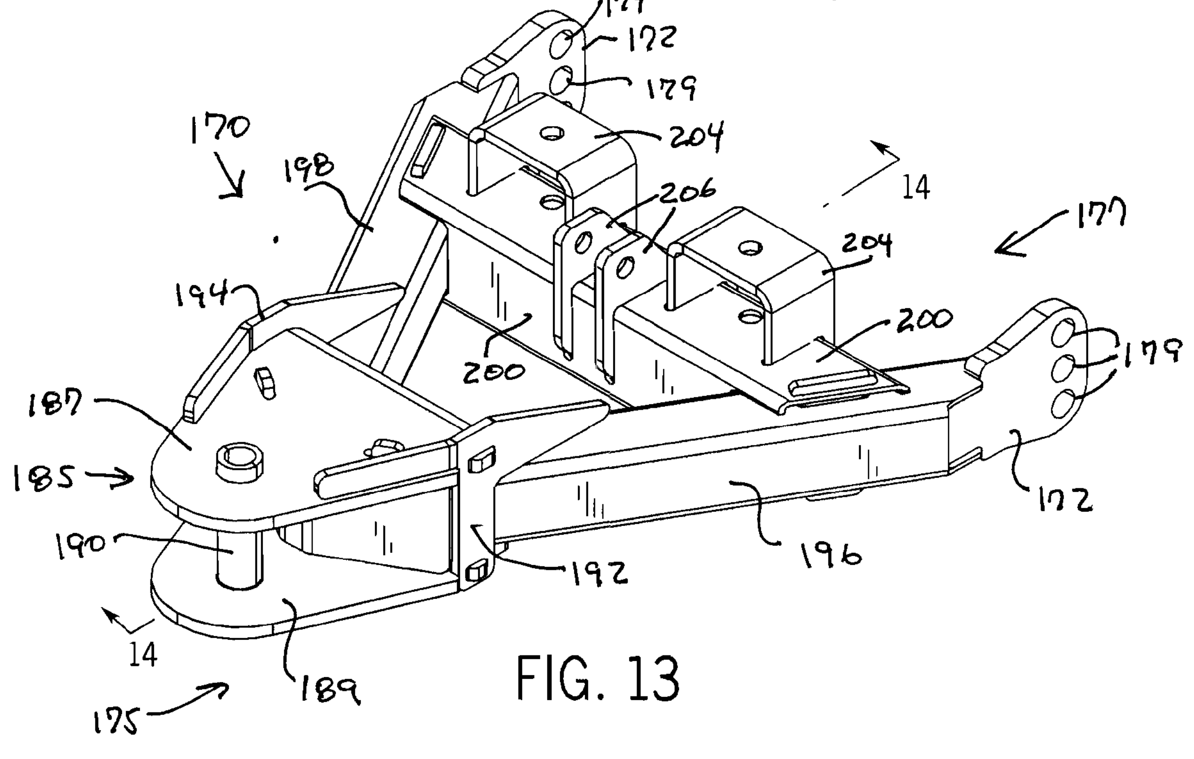
FIG. 13 is an isometric, top, front view of an exemplary embodiment of an A-frame plow frame assembly of the hitch mechanism illustrated in FIG. 3.
Figure 14:
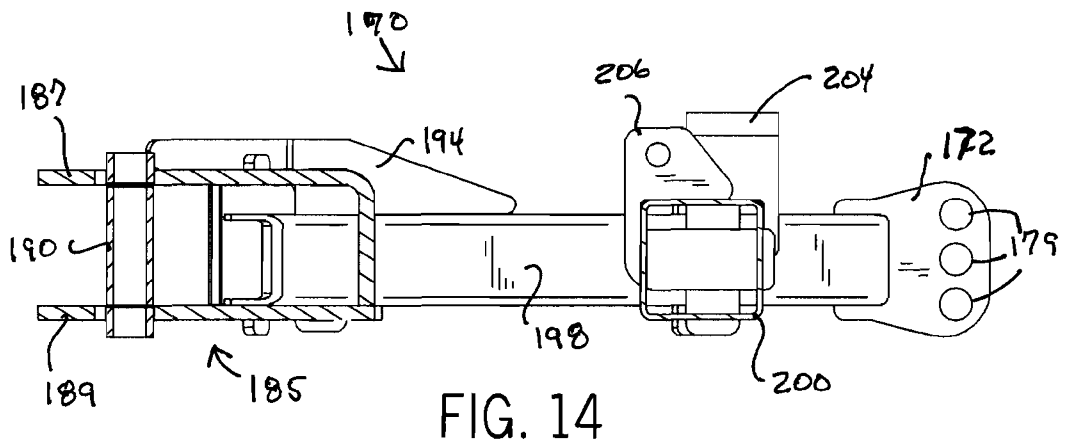
FIG. 14 is a cross sectional view of the plow frame illustrated in FIG. 13 along the line 14-14.

In one embodiment, a portion of the top plate 187 is bent downwardly at a 90 degree angle to extend the top plate 187 to the bottom plate 189 with that portion of the top plate configured to define an angled pocket to receive each of the side members 196, 198 of the plow frame 170. See FIGS. 13 and 14.

Coupled to the traverse brace tube 200 are lift cylinder mounts 206 and a pair of swing cylinder mounts 202 and 204.

Lift cylinder mounts 206 are aligned to couple the lower end of the lift cylinder 142 which is coupled to the upper lift cylinder mount 140 on the lift bar 134.

Each of the side members 196, 198 of the plow frame 170 include an adjustment lug 172 at the rear portion 177 of the plow frame 170. Each adjustment lug 172 includes a plurality of orifices 179 aligned vertically and configured to receive a bolt 232 which will couple the plow frame 170 to the lift bar lugs 138 on the lift bar assembly 130. As best seen in FIGS. 12, 12A, 12B, and 12C, the adjustment lug 172 is received between each of the lift bar lugs 138 of the lift bar assembly 130 and secured with a bolt 232. In order to adjust the plow frame height relative to the vehicle, an operator will select one of the vertical adjustment orifices 179 to properly align the plow frame 170 with the lift bar assembly 130 which is in turn coupled with the chassis couplers 108 of the hitch frame nose assembly 100.

Figure 15:
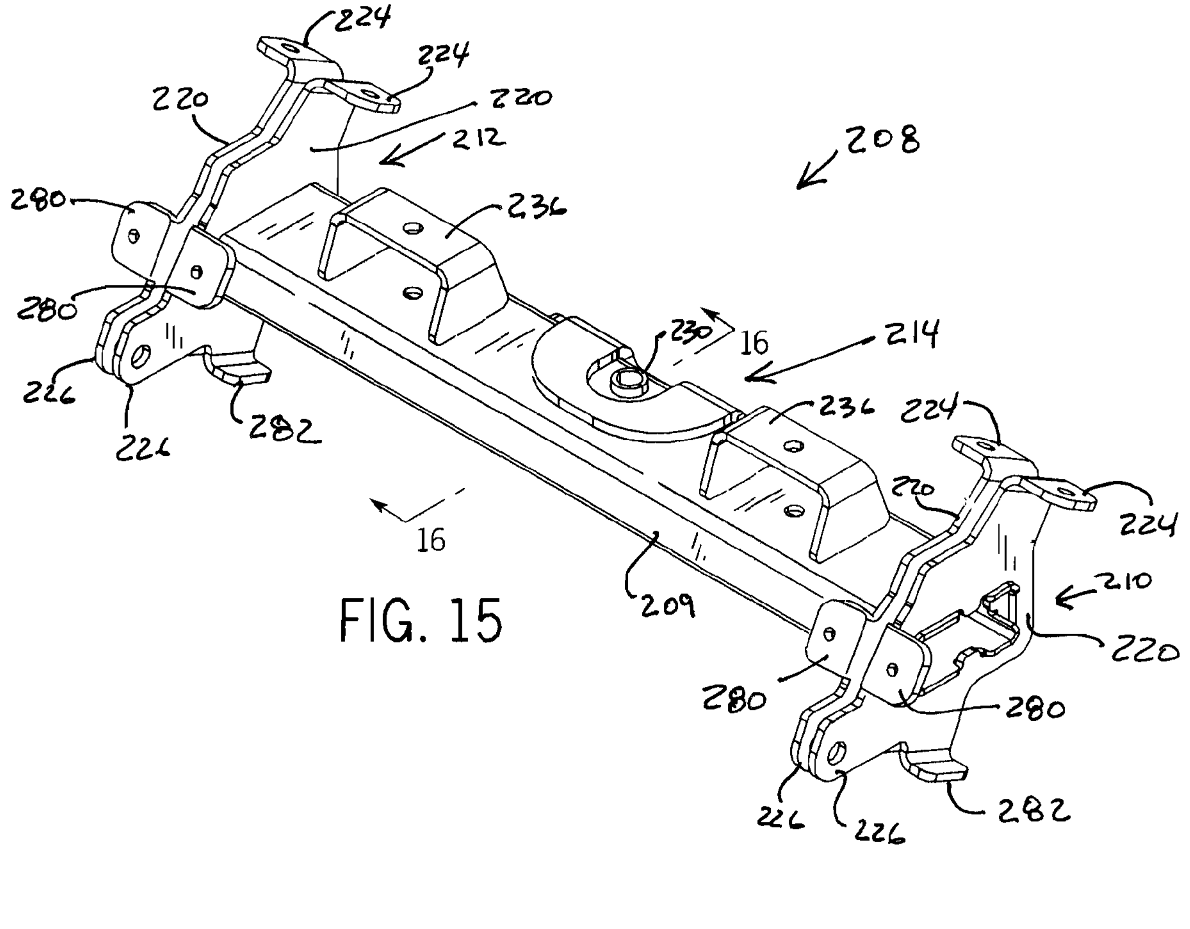
FIG. 15. is an isometric, front view of an exemplary embodiment of a swing frame of the hitch mechanism illustrated in FIG. 3.
Figure 22:
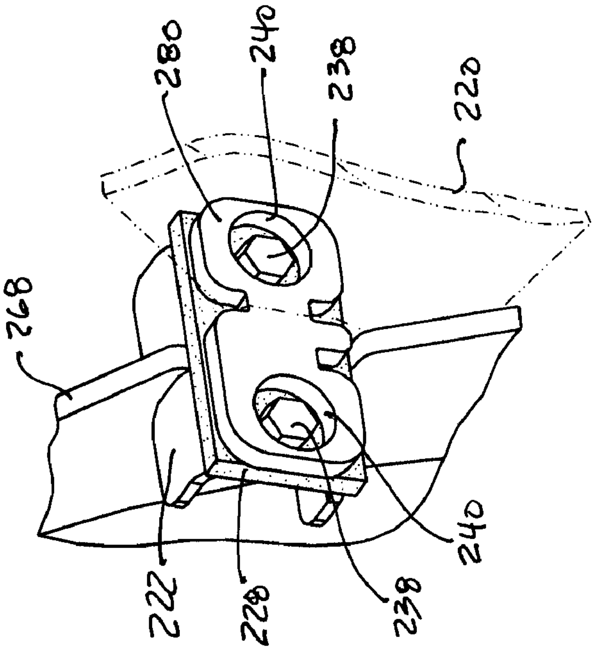
FIG. 22 is an isometric, rear view of an exemplary embodiment of a cushion block coupled to the blade illustrated in FIG. 18, with a portion of the swing frame in phantom.
Figure 16:
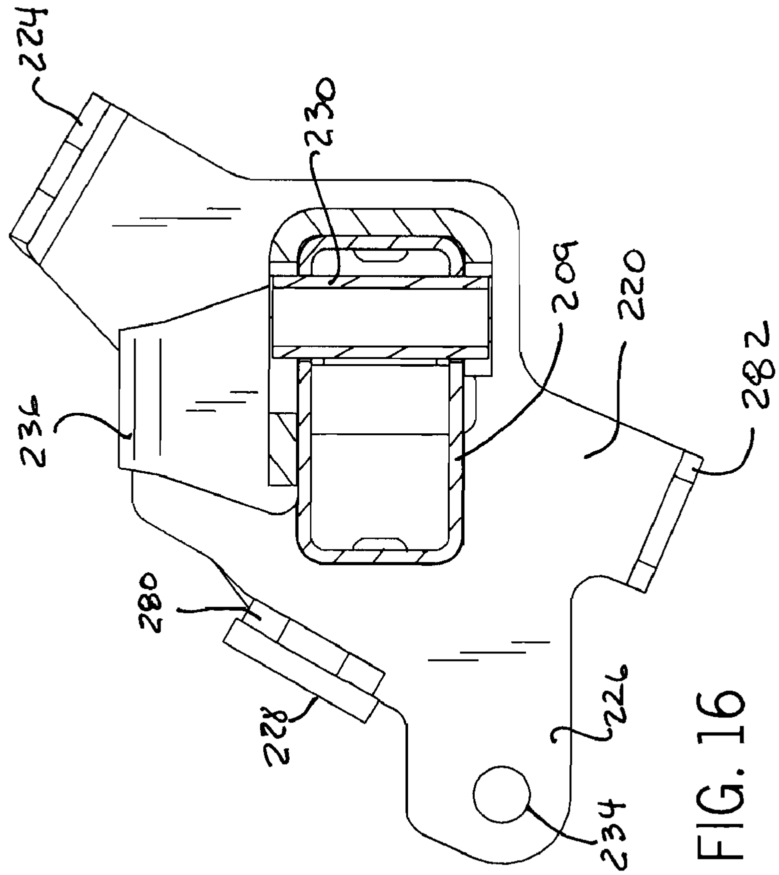
FIG. 16 is a cross sectional view of the swing frame illustrated in FIG. 15 along the line 16-16.
Figure 17A:
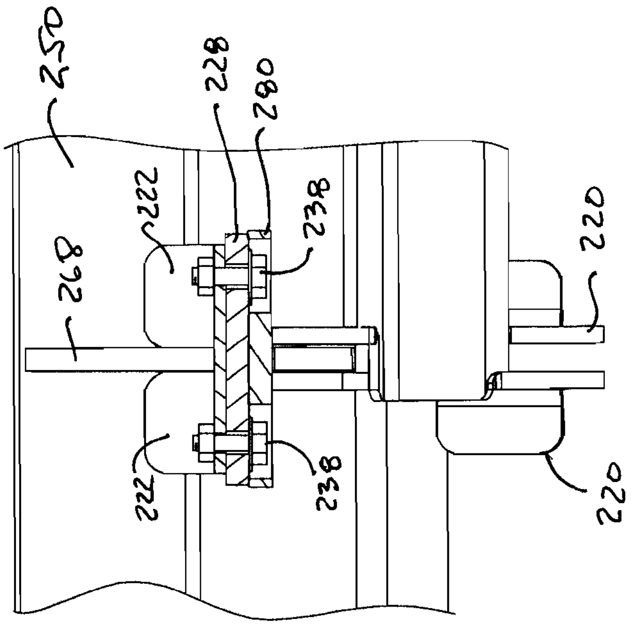
FIG. 17A is a partial cross-sectional top rear view of a cushion block assembly along the line 17A-17A of FIG. 17.
Figure 17:
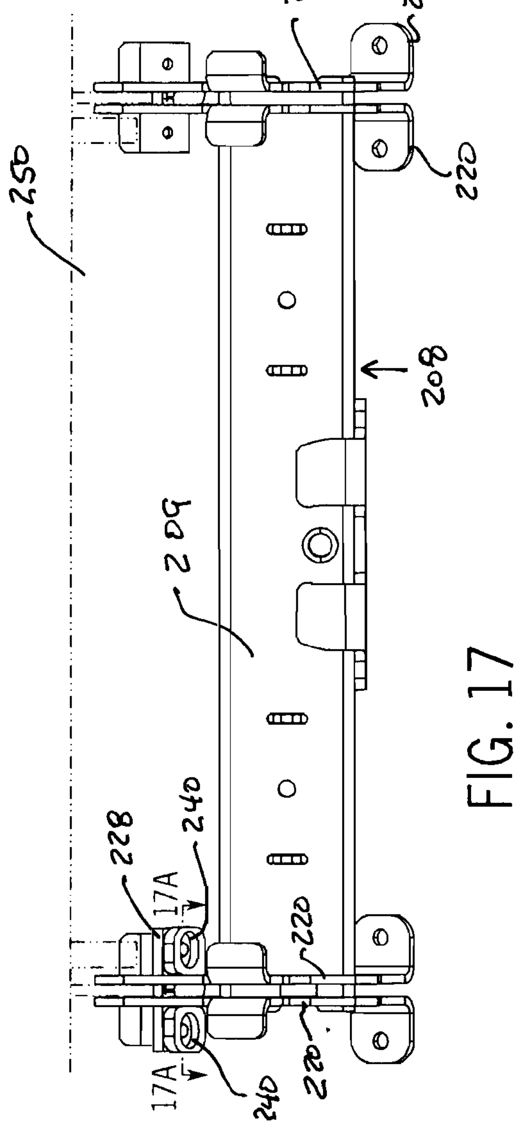
FIG. 17 is bottom view of the swing frame illustrated in FIG. 15.
Figure 18:
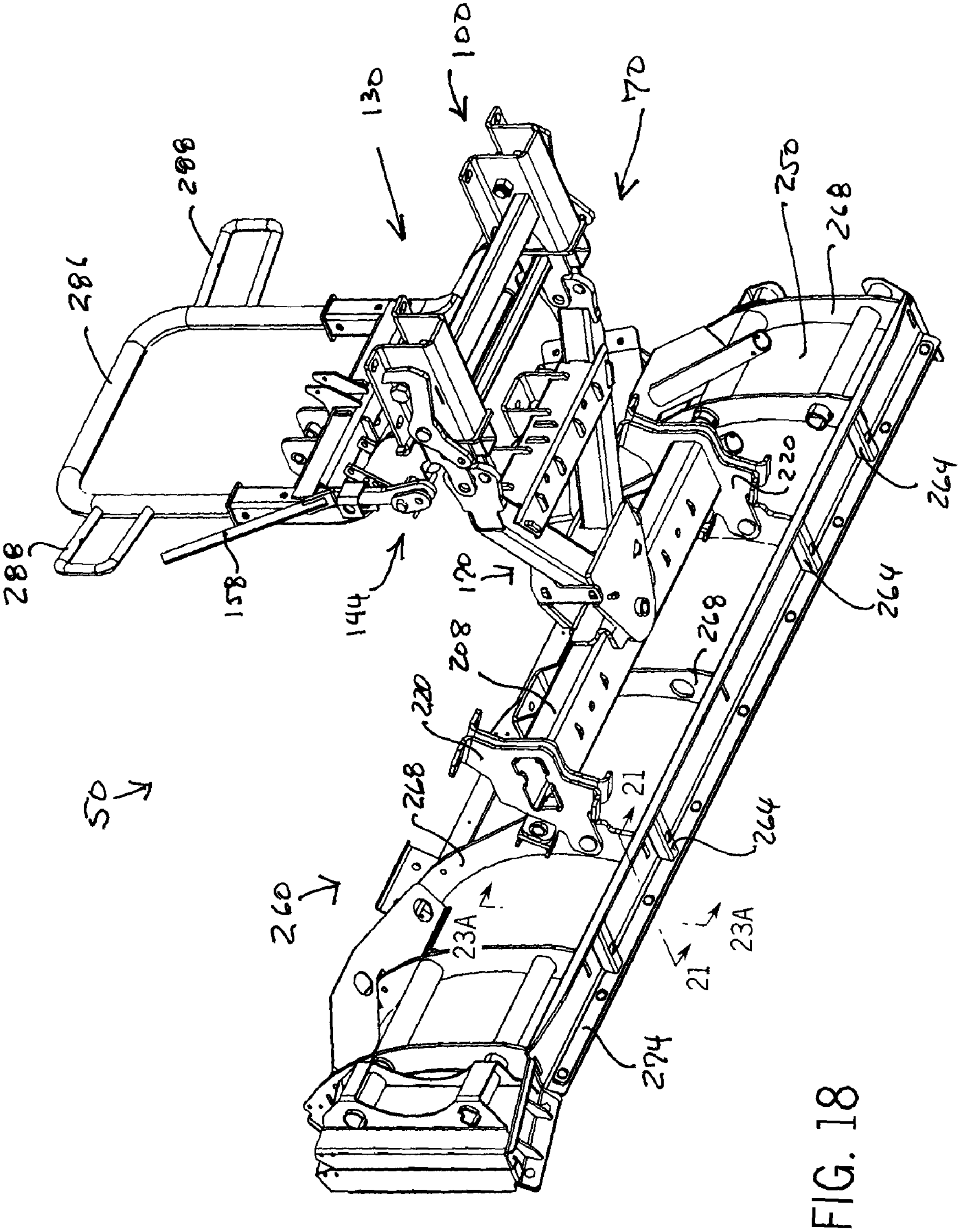
FIG. 18 is an isometric, back view of an exemplary embodiment of a blade coupled to the hitch mechanism illustrated in FIG. 3.

A swing frame 208 is pivotally coupled to the swing frame pivot assembly 184 of the plow frame 170 (see at least FIGS. 15 and 18). The swing frame 208 includes a swing frame tube 209 which has two swing frame ends 210 and 212. Coupled to each swing frame end 210, 212 is a pair of trip spring brackets 220. (See FIGS. 15 and 17.) Each trip spring bracket 220 includes a trip spring mount 224, a cushion trip plate 280 and a blade pivot mount 226. Each pair of trip spring brackets 220 are coupled to the swing frame tube 209, for example by welding.

The swing frame 208 includes a pivot 230 positioned in a center portion 214 of the swing frame tube 208. The pivot 230 couples to the swing frame pivot assembly 184 of the plow frame 170 with the swing frame pivot pin 190.

The swing frame tube 109 also supports a pair of swing cylinder mounts 236 mounted on the swing frame tube 209 with each swing cylinder mount 236 positioned between the center portion 214 of the swing frame tube 209 and one end 210, 212 of the swing frame tube 209. (See FIG. 15.) A swing cylinder 252 is coupled at one end to a swing cylinder mount 236 on the swing frame 208 and on another end on the swing cylinders mounts 202, 204 of the plow frame 170. The swing cylinder 252 as selectively operated by a user of the snow plow 50 can rotate the plow blade 250 about the pivot 230. The degree of rotation of the plow blade relative to the plow frame 170 is established by the extension capabilities of the swing cylinders 252 as selected by an operator.

The plow blade 250 is coupled to the swing frame 208 pinning the plow blade to each of the trip spring brackets 240 at the blade pivot mount 226 on each of the trip spring brackets 220. A pivot pin is received in a pivot aperture 234 and is typically secured in place by a cotter pin (not shown). It is contemplated that other means of fastening the pivot pin can be used such as a bolt and nut.

Figure 23A:
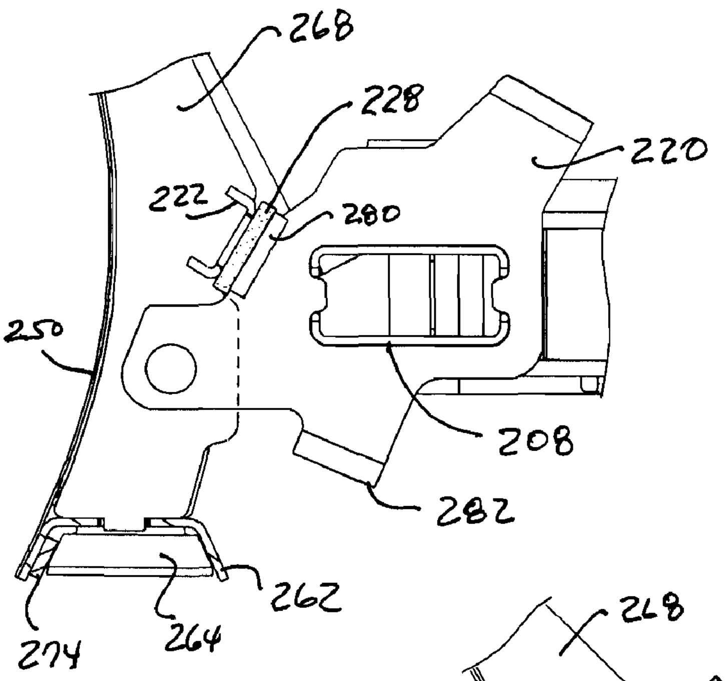
FIG. 23A is a partial cross-sectional view along the line 23A-23A of FIG. 18 showing the plow blade in a normal position.
Figure 23B:
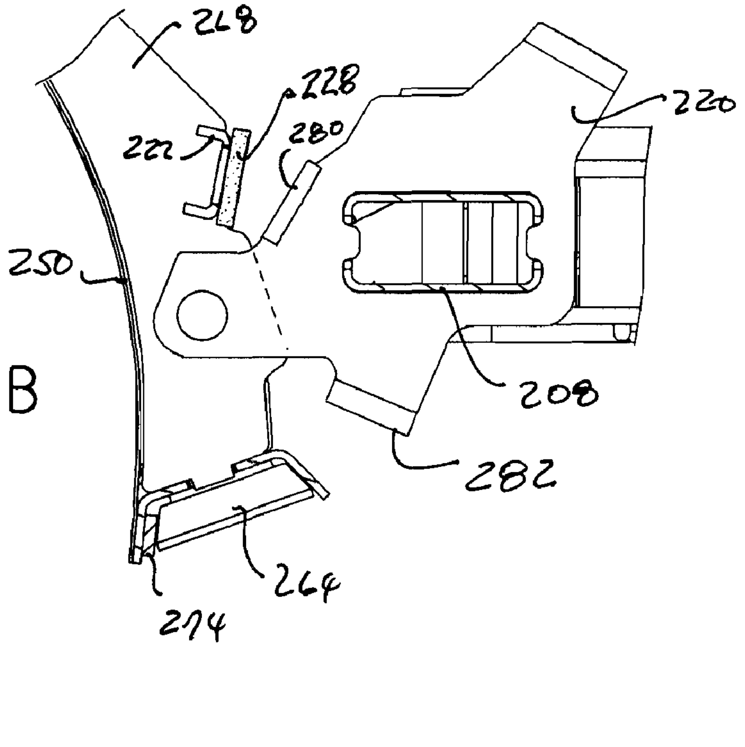
FIG. 23B is a partial cross-sectional view the plow blade illustrated in FIG. 23A showing the plow blade in a rotated position.

Also coupled to the trip spring bracket 220 is a cushion trip plate 280. The cushion trip plate 280 is configured with a pair of oversize bolt apertures 240 to accommodate a socket or other tool for manipulating a cushion bolt 238 to secure a cushion block 228 to the cushion mount 222. The cushion block 228 is substantially a rectangular shaped block of polyurethane or other high density resilient material. The cushion block 228 is used to absorb the impact of the plow blade 250 (see FIGS. 23A and 23B) as the plow blade moves between its limits. Such movement of the plow blade 250 is caused by the plow blade 250 striking an object as the plow blade 250 is moved by a vehicle. The cushion block 228 is configured to prevent damage to the snow plow by allowing the snow plow blade 250 to "trip" that is, for the bottom of the plow blade 250 to move rearward and the top of the plow blade 250 to simultaneously move forward about the blade pivot pin, resulting in a rotation of plow blade 250 around a horizontal axis. Such a rotation is inhibited by springs 284 which act as a shock absorber mechanism, and which return the plow blade 250 to a normal or "trip return" position. The springs 284 are relatively strong, since they must prevent the plow blade from rotating when it is plowing snow and the metal-to-metal impacts of both a plow trip bracket and a blade trip return can be substantial. The cushion block 228 is configured to cushion the impacts on both the blade and the trip spring bracket 220.

It is also contemplated that a back cushion (not shown) similar to the cushion block 228 can be coupled, for example by bolting, to a blade stop 282 at a lower end of each of the trip spring brackets 220. The back cushion is configured to ameliorate vibration and damage to the plow blade 250 if the plow blade contacts an obstruction during operation.

The cushion block 228 is rectangular in shape and provides a relatively large area to distribute the force exerted upon the cushion block 228 when the blade 250 moves back to its trip return position by action of the return springs 284. The relatively large cushion bolt aperture 240 allows a user to easily access the cushion bolts 238 when servicing the cushion block. Servicing of the cushion block 228 can be accomplished, for example, replacing the cushion block without having to remove the plow blade 250 from the swing frame 208. However, a slight forward rotation of the blade 250 must be provided to remove the cushion block from between the cushion mount 222 and the cushion trip plate 280.

Referring now to FIGS. 18, 19, 20 and 21, FIG. 18 illustrates a snow plow 50 with a plow blade assembly 260 coupled to a quick connect/disconnect hitch 70. FIG. 18 is a bottom, rear isometric view of the snow plow 50.

Figure 19:
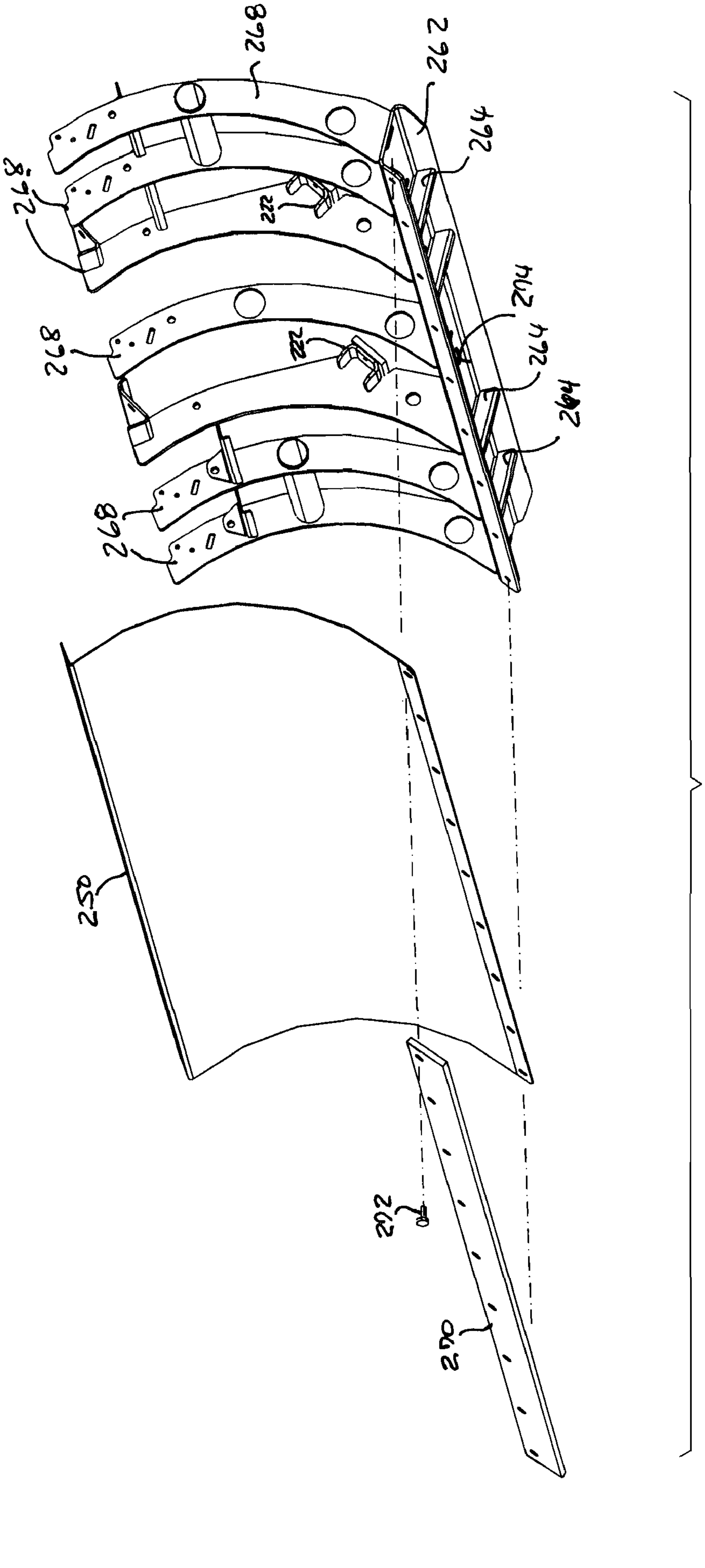
FIG. 19 is an exploded, isometric, front view of the blade illustrated in FIG. 18.

FIG. 19 is an exploded view of the plow blade assembly 260. The plow blade 250, is coupled, for example, by welding, to a plurality of plow ribs 268. Each of the plow ribs 268 are aligned vertically and coupled to a bottom plow frame member 262. The plow ribs 268 are positioned at evenly spaced intervals along the bottom plow frame member 262 and welded to the plow blade 250 and the bottom plow frame member 262. Each of the plow ribs 268 is configured in a concave curve to which the plow blade 250 conforms and which also facilitates movement of material such as snow as the plow 50 is operated. A wear strip 270 is coupled to the lower edge of the plow blade 250 by a plurality of bolts 272 which extend through the wear strip 270, the plow blade 250, the bottom plow frame member 262 and a nut plate 274 which is positioned against one of the downward extending flanges of the bottom plow frame member 262. (See at least FIG. 20.) Reinforcement members 264 are positioned between the down facing flanges of the bottom plow frame member to reinforce the plow blade assembly 260. The reinforcement members 264 are typically welded to the bottom plow frame member 262. The top edge of the plow blade 250 is bent and configured to be coupled to the top edge of each of the plow ribs 268. The top edge of the plow blade 250 is typically welded to each of the plow ribs 268.

Figure 20:
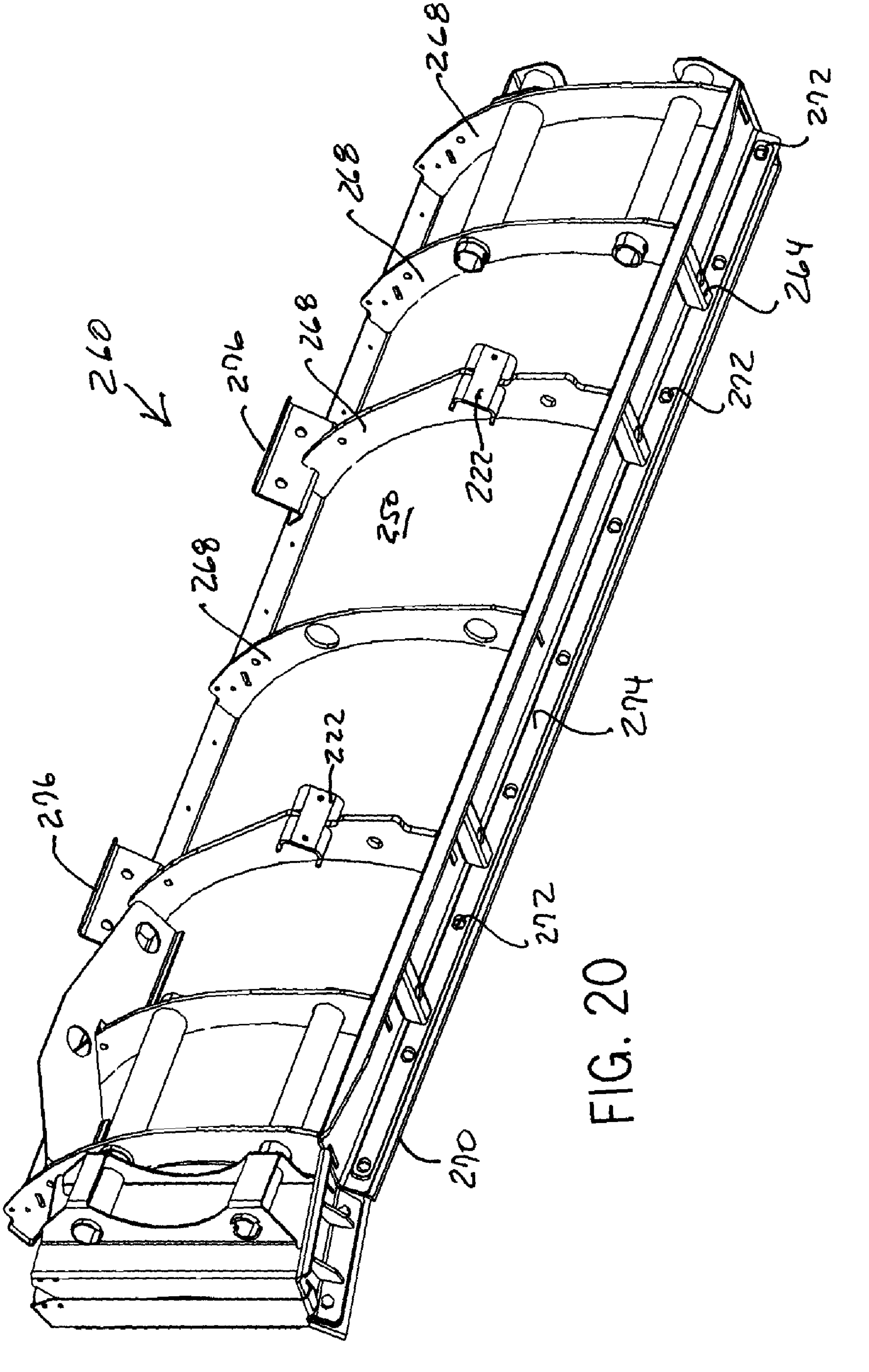
FIG. 20 is an isometric, bottom view of the blade illustrated in FIG. 18.
Figure 21:
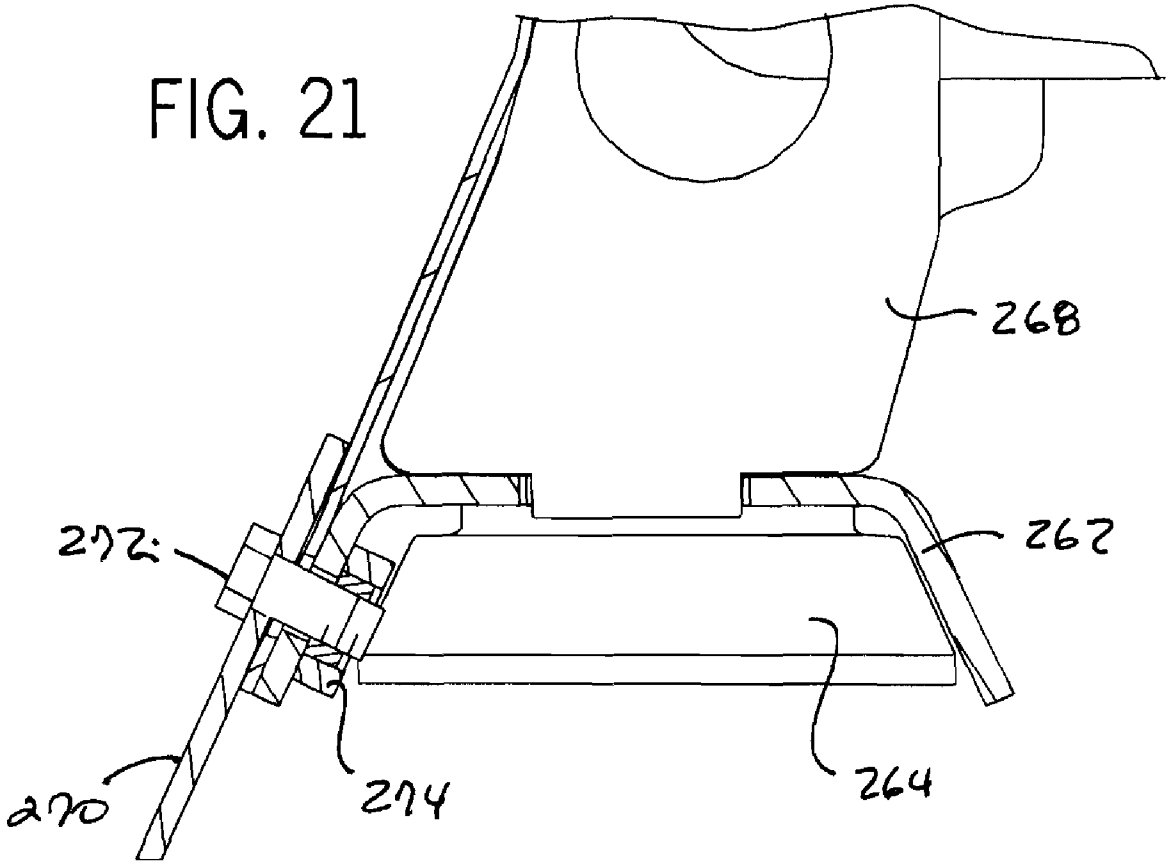
FIG. 21 is a partial cross sectional view of the bottom of the blade illustrated in FIG. 18 along the line 21-21, showing how a blade cutting edge, nut plate, moldboard and wear strip are coupled to a blade frame member.

Referring to FIG. 20, a pair of plow trip spring brackets 276 are coupled, for example, by welding, each to two of a plow rib 268. The plow trip spring brackets 276 are aligned with the spring mounts 224 on each of the spring brackets 220 coupled to the swing frame 208. A cushion mount 222 is also coupled, typically by welding, to each of the plow ribs 268 that support the plow trip spring brackets 276. A cushion block 228 is bolted to each of the cushion mounts 222 and are configured and aligned to contact a cushion trip plate 280 coupled to each of the trip spring brackets 220.

Figure 24:
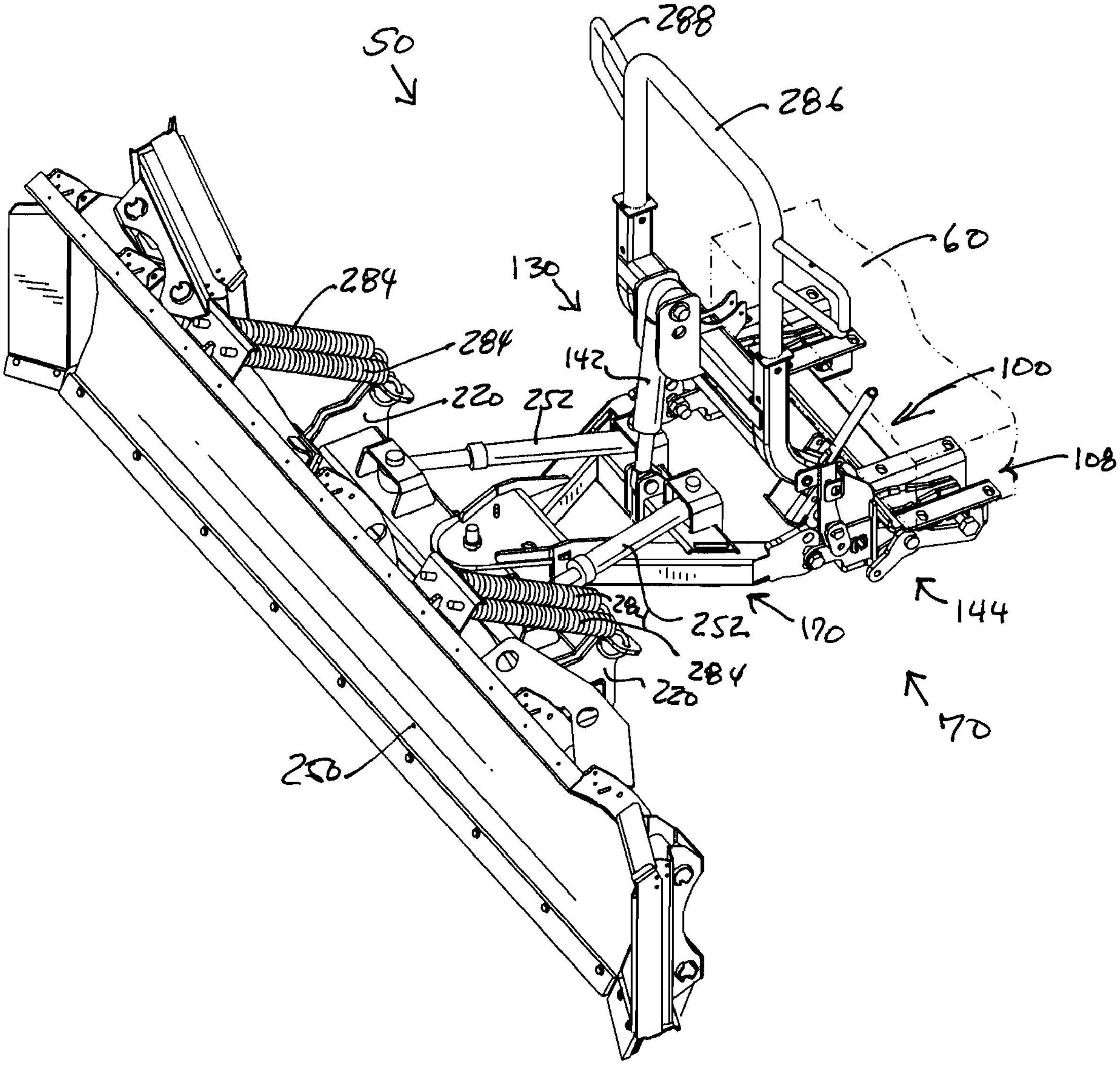
FIG. 24 is an isometric, assembly view of an exemplary embodiment of the blade illustrated in FIG. 18 and the hitch mechanism illustrated in FIG. 3 coupled together.

As illustrated in FIG. 24, a plurality of trip springs 284 are coupled to each of the plow trip spring brackets 276 and the trip spring brackets 220. FIG. 24 also illustrates a light bar 286 coupled to the lift bar support brackets 132. The light bar 286 supports a plurality of light brackets 288 to which plow lights (not shown) are coupled. Plow lights are typically needed since the snow plow 50 typically obstructs the headlights of the vehicle to which the snow plow 50 is coupled.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of a quick connect/disconnect hitch has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the hitch as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A snow plow including a quick connect/disconnect hitch, the snow plow comprising:

a hitch frame nose assembly configured to couple to a vehicle, the hitch frame nose assembly comprising a pair of U-shaped chassis couplers mechanically coupled together in a spaced-apart manner, each chassis coupler comprising a pair of spaced-apart sides and having an open front end and an opposite rear end, with each chassis coupler including a secured traverse pin extending laterally between the spaced-apart sides of the chassis coupler;

wherein the secured traverse pin in each chassis coupler extends outwardly through the side of each chassis coupler opposite the side of such chassis coupler facing the other chassis coupler; and wherein each of the sides in each chassis coupler includes a notch located in the open front ends of the sides in each chassis coupler;

a plow frame having a front portion and a rear portion, the plow frame having a plow blade coupled to the front portion;

a hitch assembly coupled to the rear portion of the plow frame, the hitch assembly comprising a spaced-apart pair of notched members, each notched member having a pair of spaced-apart side members and having a front end and an opposite rear end;

wherein the notched members are configured to be respectively received in the front ends of the chassis couplers between the sides of the chassis couplers; and wherein each of the side members in each of the notched members includes a notch opening at the rear end of the notched members configured to receive the secured traverse pin extending laterally between the spaced-apart sides of the chassis coupler therein;

a secured pivot pin extending laterally between the spaced-apart side members of each notched member, the secured pivot pin in each notched member extending outwardly through both side members of each notched member, wherein the notch located in the front ends of the sides in each chassis coupler are configured to receive the secured pivot pin extending laterally between the spaced-apart side members of the notched member therein; and a locking hook operatively coupled on one side of each notched member and coupled to a hitch locking lever operatively coupled to drive the locking hooks, with the locking hook configured to selectively engage the portion of the secured traverse pin extending from one side of each chassis coupler.

2. The snow plow of claim 1, wherein said U-shaped chassis couplers are secured at opposite ends of a hitch frame tube maintaining them in a spaced-apart relationship.

3. The snow plow of claim 1, wherein said U-shaped chassis couplers additionally comprise:

a bottom member coupled intermediate the spaced-apart sides to maintain them in a spaced-apart relationship.

4. The snow plow of claim 1, additionally comprising:

a plate member coupled intermediate the side members of each of the notched members to maintain them in a spaced-apart relationship.

5. The snow plow of claim 1, wherein the notched members are each tapered at their rear ends to facilitate engagement with the chassis couplers.

6. The snow plow of claim 1, wherein the plow frame and the hitch frame nose assembly are not free to move away from each other when the pair of notched members are engaged and locked with the chassis couplers.

7. The snow plow of claim 1, wherein the hitch locking lever is configured to move from an unlocked position sequentially to a first locked position and then a second locked position, with the hitch locking lever remaining in the second locked position until it is sequentially moved to the first locked position and then the unlocked position, wherein the locking hook engages the one portion of the secured traverse pin extending from one side of each chassis coupler.

8. A quick connect/disconnect hitch for mounting a plow onto a vehicle, the quick connect/disconnect hitch comprising:

a hitch frame nose assembly configured to couple to a vehicle, the hitch frame nose assembly comprising a pair of U-shaped chassis couplers mechanically coupled together in a spaced-apart manner, each chassis coupler comprising a pair of spaced-apart sides and having an open front end and an opposite rear end, with each chassis coupler including a secured traverse pin extending laterally between the spaced-apart sides of the chassis coupler;

wherein the secured traverse pin in each chassis coupler extends outwardly through the side of each chassis coupler opposite the side of such chassis coupler facing the other chassis coupler; and wherein each of the sides in each chassis coupler includes a notch located in the open front ends of the sides in each chassis coupler;

a hitch assembly configured to couple to a rear portion of a plow frame having a front portion thereof coupled to a plow blade, the hitch assembly comprising a spaced-apart pair of notched members, each notched member having a pair of spaced-apart side members and having a front end and an opposite rear end;

wherein the notched members are configured to be respectively received in the front ends of the chassis couplers between the sides of the chassis couplers; and wherein each of the side members in each of the notched members includes a notch opening at the rear end of the notched members configured to receive the secured traverse pin extending laterally between the spaced-apart sides of the chassis coupler therein;

a secured pivot pin extending laterally between the spaced-apart side members of each notched member, the secured pivot pin in each notched member extending outwardly through both side members of each notched member, wherein the notch located in the front ends of the sides in each chassis coupler are configured to receive the secured pivot pin extending laterally between the spaced-apart side members of the notched member therein and at least one locking member that selectively, releasably secures the hitch assembly to the hitch frame nose assembly once they are engaged.

9. The quick connect/disconnect hitch of claim 8, wherein the locking member comprises:

a locking hook operatively coupled on one side of each notched member and coupled to a hitch locking lever operatively coupled to drive the locking hooks, with the locking hook configured to selectively engage the portion of the secured traverse pin extending from one side of each chassis coupler.

10. The quick connect/disconnect hitch of claim 9, wherein the hitch locking lever is configured to move from an unlocked position sequentially to a first locked position and then a second locked position, with the hitch locking lever remaining in the second locked position until it is sequentially moved to the first locked position and then the unlocked position, wherein the locking hook engages the one portion of the secured traverse pin extending from one side of each chassis coupler.

11. The quick connect/disconnect hitch of claim 8, wherein said U-shaped chassis couplers are secured at opposite ends of a hitch frame tube maintaining them in a spaced-apart relationship.

12. The quick connect/disconnect hitch of claim 8, wherein said U-shaped chassis couplers additionally comprise:

a bottom member coupled intermediate the spaced-apart sides to maintain them in a spaced-apart relationship.

13. The quick connect/disconnect hitch of claim 8, additionally comprising:

a plate member coupled intermediate the side members of each of the notched members to maintain them in a spaced-apart relationship.

14. The quick connect/disconnect hitch of claim 8, wherein the notched members are each tapered at their rear ends to facilitate engagement with the chassis couplers.

15. A quick connect/disconnect hitch for mounting a plow onto a vehicle, the quick connect/disconnect hitch comprising:

a hitch frame nose assembly configured to couple to a vehicle, the hitch frame nose assembly comprising a pair of chassis couplers mechanically coupled together in a spaced-apart manner, each chassis coupler comprising a pair of spaced-apart sides and having an open front end, with each chassis coupler including a secured traverse pin extending laterally between the spaced-apart sides of the chassis coupler;

wherein the secured traverse pin in each chassis coupler extends outwardly through the side of each chassis coupler opposite the side of such chassis coupler facing the other chassis coupler; and wherein each of the sides in each chassis coupler includes a notch located in the open front ends of the sides in each chassis coupler; and a hitch assembly configured to couple to a plow frame, the hitch assembly comprising a spaced-apart pair of notched members, each notched member having a front end and an opposite rear end;

wherein the notched members are configured to be respectively received in the front ends of the chassis couplers between the sides of the chassis couplers; and wherein each of the notched members include a notch opening at the rear end thereof configured to receive the secured traverse pin extending laterally between the spaced-apart sides of the chassis coupler therein;

a secured pin extending outwardly from opposite sides of each notched member, wherein the notch located in the front ends of the sides in each chassis coupler are configured to receive the secured pin extending outwardly from opposite sides of the notched member therein; and at least one locking member that selectively, releasably secures the hitch assembly to the hitch frame nose assembly once they are engaged.

16. The quick connect/disconnect hitch of claim 15, wherein each notched member has a pair of spaced-apart side members, and wherein each of the side members in each of the notched members includes the notch opening at the rear end of the notched members.

17. The quick connect/disconnect hitch of claim 16, additionally comprising:

a plate member coupled intermediate the side members of each of the notched members to maintain them in a spaced-apart relationship.

18. The quick connect/disconnect hitch of claim 16, wherein the notched members are each tapered at their rear ends to facilitate engagement with the chassis couplers.

19. The quick connect/disconnect hitch of claim 15, wherein the locking member comprises:

a locking hook operatively coupled on one side of each notched member and configured to selectively engage the portion of the secured traverse pin extending from one side of each chassis coupler.

20. The quick connect/disconnect hitch of claim 15, wherein said chassis couplers additionally comprise:

a bottom member coupled intermediate the spaced-apart sides to maintain them in a spaced-apart relationship.

* * * * *